United States Patent
Corkum et al.

(10) Patent No.: US 12,283,471 B2
(45) Date of Patent: Apr. 22, 2025

(54) MASS CYTOMETRY

(71) Applicant: Fluidigm Canada Inc., Markham (CA)

(72) Inventors: Paul Corkum, Markham (CA);
Alexander Loboda, Markham (CA);
David M. Rayner, Markham (CA)

(73) Assignee: Fluidigm Canada Inc., Markham (CA)

( * ) Notice: Subject to any disclaimer, the term of this patent is extended or adjusted under 35 U.S.C. 154(b) by 463 days.

(21) Appl. No.: 17/620,049

(22) PCT Filed: Jun. 17, 2020

(86) PCT No.: PCT/US2020/038097
§ 371 (c)(1),
(2) Date: Dec. 16, 2021

(87) PCT Pub. No.: WO2020/257258
PCT Pub. Date: Dec. 24, 2020

(65) Prior Publication Data
US 2022/0310373 A1  Sep. 29, 2022

Related U.S. Application Data

(60) Provisional application No. 62/862,849, filed on Jun. 18, 2019.

(51) Int. Cl.
*G01N 15/14* (2024.01)
*G01N 15/10* (2024.01)
(Continued)

(52) U.S. Cl.
CPC .......... *H01J 49/0004* (2013.01); *G01N 15/14* (2013.01); *H01J 49/0463* (2013.01); *H01J 49/164* (2013.01); *G01N 2015/1006* (2013.01)

(58) Field of Classification Search
CPC .. H01J 49/0004; H01J 49/164; H01J 49/0463; H01J 49/161; H01J 49/16; G01N 15/14; G01N 2015/1006
See application file for complete search history.

(56) References Cited

U.S. PATENT DOCUMENTS

| 5,225,326 A | 7/1993 | Bresser et al. |
| 5,742,050 A * | 4/1998 | Amirav .............. H01J 49/0422 250/288 |

(Continued)

FOREIGN PATENT DOCUMENTS

| CA | 3032861 A1 * | 2/2018 | .......... H01J 49/0004 |
| JP | 2003194748 A | 7/2003 | |

(Continued)

OTHER PUBLICATIONS

International Application No. PCT/US20/38097 received an International Search Report and Written Opinion mailed Dec. 24, 2020, 9 pages.

(Continued)

*Primary Examiner* — David E Smith
(74) *Attorney, Agent, or Firm* — Kilpatrick Townsend & Stockton LLP

(57) ABSTRACT

Embodiments of the present invention relate to replacement of the previous ICP-based ionisation system with a new laser ionisation system, providing improved mass spectrometer-based apparatus and methods for using them to analyse samples, in particular the use of mass spectrometry mass cytometry, imaging mass spectrometry and imaging mass cytometry, for the analysis of biological samples. Accordingly, embodiments of the present invention provide an apparatus, for example a mass cytometer, comprising: 1) a sampler; 2) a laser ionisation system to receive material removed from the sample by the sampler, wherein the laser ionisation system comprises an ionisation system conduit and a pulsed laser adapted to ionise sample material passing through or exiting the ionisation system conduit; and 3) a mass spectrometer to receive elemental ions from said ionisation system and to analyse said elemental ions.

25 Claims, 7 Drawing Sheets

(51) Int. Cl.
*H01J 49/00* (2006.01)
*H01J 49/04* (2006.01)
*H01J 49/16* (2006.01)

(56) References Cited

U.S. PATENT DOCUMENTS

| | | | |
|---|---|---|---|
| 8,723,108 B1 | 5/2014 | Ugarov | |
| 2003/0127591 A1* | 7/2003 | Vandervorst | G01N 27/628 |
| | | | 250/288 |
| 2005/0236565 A1* | 10/2005 | Oser | H01J 49/0431 |
| | | | 250/288 |
| 2010/0092972 A1 | 4/2010 | Millar et al. | |
| 2013/0164750 A1 | 6/2013 | Nielsen et al. | |
| 2015/0187558 A1 | 7/2015 | Mills et al. | |
| 2016/0056031 A1 | 2/2016 | Loboda | |
| 2016/0203966 A1 | 7/2016 | Vertes et al. | |
| 2017/0140913 A1* | 5/2017 | Hitchcock | H01J 49/162 |
| 2019/0267225 A1* | 8/2019 | Riedel | H01J 49/0422 |

FOREIGN PATENT DOCUMENTS

| | | | | |
|---|---|---|---|---|
| JP | 2007535097 A | 11/2007 | | |
| JP | 2014228430 A | 12/2014 | | |
| JP | 2016522887 A | 8/2016 | | |
| WO | 2011/098834 A1 | 8/2011 | | |
| WO | WO-2014079802 A2 * | 5/2014 | ......... | H01J 49/0004 |
| WO | 2014/091243 A1 | 6/2014 | | |
| WO | 2014/127034 A1 | 8/2014 | | |
| WO | 2014/146724 A1 | 9/2014 | | |
| WO | 2014/169394 A1 | 10/2014 | | |
| WO | 2018091910 A1 | 5/2018 | | |

OTHER PUBLICATIONS

Japanese Application No. JP2021-573218, Office Action, Mailed on May 14, 2024, 7 pages.

* cited by examiner

MASS CYTOMETRY

CROSS-REFERENCE TO RELATED APPLICATIONS

This application claims the benefit of priority to U.S. Provisional Application No. 62/862,849, filed Jun. 18, 2019, the contents of which is incorporated herein by reference for all purposes.

FIELD

Embodiments relate to the analysis of samples using mass cytometry and/or elemental mass spectrometry.

BACKGROUND

The ability to analyse single cells (or other particles such as single beads), is useful because it allows the properties of each member of a population to have its properties determined separately. This analysis therefore provides a greater insight than a single measurement that is simply the average of the properties of each member of the population.

A fluorescence activated cell sorter (FACS) can measure the properties of cells or particles by scanning them as they pass through a laser beam. By labelling the cells or particles with fluorescent dyes specific to cell components, for example, receptors on the cell surface and DNA of the cell nucleus, the amount of labelled component can be detected as fluorescence when the particle or cell traverses the excitation beam. Since the amount of fluorescence emitted is proportional to the amount of fluorescent probe bound to the cell/antigen, antibodies conjugated to fluorochromes are routinely used as reagents to measure the antigen both qualitatively and quantitatively on and in the cell. Deficiencies of this approach are related to limitations and difficulties of cell staining methods and spectral overlap of fluorochromes. In other words, the detected emission of fluorochromes is not all at a specific wavelength, which means that when multiple labels are used, some of the detected emitted light can be mistakenly assigned to an incorrect label. This therefore limits the discriminatory power of the technique.

A technique which overcomes this problem is mass cytometry. It is analogous to flow cytometry in that a label is specifically attached to the material being analysed. The label is specifically targeted to an antigen on the cell or particle, using a specific binding partner, for example an antibody. The label is different between flow cytometry and mass cytometry. In mass cytometry, the one or more detectable labels are atoms of a known specific mass, typically transition metals, such as the rare earth metals. Accordingly, when the detectable labelling atoms are detected by the MS, it can be inferred that the target of the specific binding partner is present in the sample being analysed.

A related technique is imaging mass cytometry (IMC). Here, rather than cells in a liquid suspension being introduced into the mass cytometer as a suspension, material is ablated from a biological sample, e.g. a tissue sample, and the ablated material analysed by mass spectrometry. In the same manner, elemental labels used to tag specific targets on the sample can be detected by the MS, and their presence inferred in the ablated material. By recording the location of where ablation was performed on the sample and the quantity of elemental tag detected, it is possible to build up an image of the target's distribution in the sample. Similarly, like mass cytometry of liquid samples, it is possible to use MS to detect many different elemental tags simultaneously, meaning that highly multiplexed imaging can be performed.

At the same time, a map of an element that is present in the natural state of the tissue can also be recorded by imaging mass spectrometry such as by laser ablation ICP-MS of tissue sections.

DETAILED DESCRIPTION

The apparatus, for example a mass spectrometer, mass cytometer, imaging mass spectrometer or imaging mass cytometer, typically includes three core components in embodiments.

The first is a sampler for introducing material from a sample into the other components of the apparatus. After it has been taken into the apparatus, before the atoms in the sample (including the detectable labelling atoms) can be detected by a mass spectrometer component (MS component; the third component), the sample must be ionised. Accordingly, the apparatus comprises a second component which is an ionisation system that ionises the atoms to enable their detection by the MS component based on mass/charge ratio. Thus the sample is taken into the apparatus, is ionised by the ion source, and the ions of the sample are passed into the MS component. Although the MS component can detect many ions, and can be adapted to do so in certain applications, most of these will be ions of the atoms that naturally make up the sample. In some applications, for example analysis of minerals, such as in geological or archaeological applications, this may be sufficient.

In some cases, for example when analysing biological samples, the native element composition of the sample may not be suitably informative. This is because, typically, all proteins and nucleic acids are comprised of the same main constituent atoms, and so while it is possible to tell regions which contain protein/nucleic acid from those that do not contain such proteinaceous or nucleic acid material, it is not possible to differentiate a particular protein from all other proteins. However, by labelling the sample with atoms not present in the material being analysed under normal conditions, or at least not present in significant amounts (for example certain transition metal atoms, such as rare earth metals; see section on labelling below for further detail), specific characteristics of the sample can be determined. In common with IHC and FISH, the detectable labels can be attached to specific targets on or in the sample (such as fixed cells or a tissue sample on a slide), inter alia through the use of SBPs such as antibodies, nucleic acids or lectins etc. targeting molecules on or in the sample. In order to detect the ionised label, the detector system is used, as it would be to detect ions from atoms naturally present in the sample. Usually, where a liquid sample is being analysed, particles, such as cells, in the solution are introduced into the ionisation system one at a time, thereby ensuring that the resulting atoms detected by the MS component can be assigned to a specific particle, in turn enabling individual characterisation of each analysed part of the sample. Sometimes, however, where mass cytometry is performed on a liquid sample, multiple particles in solution are deliberately ionised and detected at the same time. Where the sample is a solid biological sample, such as a tissue sample, then typically laser ablation is used to generate a plume of material from the tissue sample for introduction into the ionisation system and subsequent detection of the ions by the MS component. Here, in the same manner as analysis each particle individually particle-by-particle in a liquid sample, each plume generated from the solid sample is analysed plume-byplume. Imaging of biological samples via LA-ICP-MS has previously been reported for imaging at a cellular resolution.

Many current mass spectrometry apparatus, including current mass cytometers, use an inductively coupled plasma (ICP) as the ionisation system before the ionised material is then introduced into the MS. The ICP is maintained in an ICP torch, as illustrated in FIG. 1. Mass spectrometers can resolve ions generated by the ionisation system that are one atomic mass unit apart, with minimal interference between the mass channels. All kinds of mass spectrometers can be used as the mass spectrometer component of the systems discussed herein, for example a time of flight (TOF) detector is useful.

Embodiments of the present invention relate to replacement of the previous ICP-based ionisation system with a new laser ionisation system, providing improved mass spectrometer-based apparatus and methods for using them to analyse samples, in particular the use of mass spectrometry mass cytometry, imaging mass spectrometry and imaging mass cytometry, for the analysis of biological samples. Accordingly, embodiments of the present invention provide an apparatus, for example a mass cytometer, comprising:
1) a sampler;
2) a laser ionisation system to receive material removed from the sample by the sampler, wherein the laser ionisation system comprises an ionisation system conduit and a pulsed laser adapted to ionise sample material passing through or exiting the ionisation system conduit; and 3) a mass spectrometer to receive elemental ions from said ionisation system and to analyse said elemental ions.

With reference to FIG. 2, which sets out one embodiment of the apparatus, the apparatus comprises a sampler (100) which provides sample material for ionisation by the laser ionisation system (200). The sampler (100) is in communication with the laser ionisation system (200), and sample material passes from the sampler (100) to the laser ionisation system (200) through a conduit. The sample material may be liquid and/or gaseous. The sample material is carried along the conduit, at least in part, by a carrier gas, such as a cloud of gaseous material in the carrier gas or a droplet of liquid in the carrier gas. The laser ionisation system (200) comprises an ionisation conduit (210) and a laser (220). The material is ionised in the conduit (210) by laser light (221) from the laser (220). In some systems, the laser (220) is a pulsed laser, such as a femtosecond laser. Following ionisation, the ions are detected by a mass spectrometer (300). Many types of mass analysers are suitable for use in the apparatus, for example a TOF detector.

Sample Introduction

The sampler of the apparatus can take a number of forms, appropriate to the sample being analysed.

When the sample is liquid, then the sampler that introduces the sample into the laser ionisation system can be a sample loop. A sample loop is used to store liquid manually injected into the mass cytometer by a user, and then a pump can drive the sample into the laser ionisation system for ionisation and subsequent analysis. The liquid sample typically contains particles, e.g. cells (prokaryotic or eukaryotic) or viruses, which are introduced into the laser ionisation system. The use of loops is advantageous in situations wherein the user wishes quickly to introduce a sample into the mass cytometer.

In some mass cytometers of embodiments of the present invention, an autosampler is used as the sampler. An autosampler automates the process of taking sample into the mass cytometer system for subsequent analysis. An autosampler is a robotic component that takes accurate volumes (which may be user-defined) of sample into the system, from one or more vessels outside of the system. The autosampler therefore enables multiple samples to be subjected to mass cytometry without supervision of the system by a user, and with greater accuracy and repeatability than manual sample introduction.

Autosamplers are commercially available, for example for use in gas or liquid chromatography analysis (e.g. from Agilent or Thermo Scientific), and in flow cytometry (e.g. HyperCyt® Autosampler from Intellicyt, or the Attune Autosampler from Life Technologies etc.).

In some embodiments, the samples analysed are solid samples, such as geological mineral samples etc. or biological samples on a solid substrate (e.g. a tissue section or a monolayer of cells or individual cells, such as where a cell suspension has been dispensed onto a microscope slide, as discussed in more detail below). These samples are introduced to the laser ionisation system by a laser ablation (LA) system. Accordingly, in some embodiments the sampler is an LA system. The use of an LA system permits imaging of the sample. Different target molecules in the sample are labelled with different labelling atoms and the laser ablation is then performed across multiple cells of the labelled tissue sample. By linking detected signals to the known positions of the laser ablations which gave rise to those signals the method permits localisation of the labelled target molecule to specific locations on the sample, and thus construction of an image of the sample.

The Components of an Imaging Apparatus, Such as an La-Mass Cytometer

Laser Ablation Sampling System

In brief summary, the components of a laser ablation sampling system include a laser source that emits a beam of laser radiation that is directed upon a sample. The sample is positioned on a stage within a chamber in the laser ablation sampling system (the sample chamber). The stage is usually a translation stage, so that the sample can be moved relative to the beam of laser radiation, whereby different locations on the sample can be sampled for analysis. As discussed below in more detail, gas is flowed through the sample chamber, and the flow of gas carries away the plumes of aerosolised material generated when the laser source ablates the sample, for analysis and construction of an image of the sample based on its elemental composition (including labelling atoms such as labelling atoms from elemental tags). As explained further below, in an alternative mode of action, the laser system of the laser ablation sampling system can also be used to desorb material from the sample.

For biological samples (cells, tissues sections etc.) in particular, the sample is often heterogeneous (although heterogeneous samples are known in other fields of application of the disclosure, i.e. samples of a non-biological nature). A heterogeneous sample is a sample containing regions composed of different materials, and so some regions of the sample can ablate at lower threshold fluence at a given wavelength than the others. The factors that affect ablation thresholds are the absorbance coefficient of the material and mechanical strength of material. For biological tissues, the absorbance coefficient will have a dominant effect as it can vary with the laser radiation wavelength by several orders of magnitude. For instance, in a biological sample, when utilising nanosecond laser pulses a region that contains proteinaceous material will absorb more readily in the 200-230 nm wavelength range, while a region containing predominantly DNA will absorb more readily in the 260-280 nm wavelength range.

It is possible to conduct laser ablation at a fluence near the ablation threshold of the sample material. Ablating in this manner often improves aerosol formation which in turn can help improve the quality of the data following analysis. Often to obtain the smallest crater, to maximise the resolution of the resulting image, a Gaussian beam is employed. A cross section across a Gaussian beam records an energy density profile that has a Gaussian distribution. In that case, the fluence of the beam changes with the distance from the centre. As a result, the diameter of the ablation spot size is a function of two parameters: (i) the Gaussian beam waist ($1/e^2$), and (ii) the ratio between the fluence applied and the threshold fluence.

Thus, in order to ensure consistent removal of a reproducible quantity of material with each ablative laser pulse, and thus maximise the quality of the imaging data, it is useful to maintain a consistent ablation diameter which in turn means adjusting the ratio of the energy supplied by the laser pulse to the target to the ablation threshold energy of the material being ablated. This requirement represents a problem when ablating a heterogeneous sample where the threshold ablation energy varies across the sample, such as a biological tissue where the ratio of DNA and protein material varies, or in a geological sample, where it varies with the particular composition of the mineral in the region of the sample. To address this, more than one wavelength of laser radiation can be focused onto the same ablation location on a sample, to more effectively ablate the sample based on the composition of the sample at that location.

Lasers

Generally, the choice of wavelength and power of the laser used for ablation of the sample can follow normal usage in cellular analysis. The laser must have sufficient fluence to cause ablation to a desired depth, without substantially ablating the sample carrier. A laser fluence of between 0.1-5 $J/cm^2$ is typically suitable e.g. from 3-4 $J/cm^2$ or about 3.5 $J/cm^2$, and the laser will ideally be able to generate a pulse with this fluence at a rate of 200 Hz or greater. In some instances, a single laser pulse from such a laser should be sufficient to ablate cellular material for analysis, such that the laser pulse frequency matches the frequency with which ablation plumes are generated. In general, to be a laser useful for imaging biological samples, the laser should produce a pulse with duration below 100 ns (preferably below 1 ns) which can be focused to, for example, the specific spot sizes discussed herein.

For instance, the frequency of ablation by the laser system is within the range 200 Hz-100 MHz, 200 Hz-10 MHz, 200 Hz-1 MHz, 200 Hz-100 kHz, within the range 500-50 kHz, or within the range 1 kHz-10 kHz.

At these frequencies the instrumentation must be able to analyse the ablated material rapidly enough to avoid substantial signal overlap between consecutive ablations, if it is desired to resolve each ablated plume individually (which as set out below may not necessarily be desired when firing a burst of pulses at a sample). It is preferred that the overlap between signals originating from consecutive plumes is <10% in intensity, more preferably <5%, and ideally <2%. The time required for analysis of a plume will depend on the washout time of the sample chamber (see sample chamber section below), the transit time of the plume aerosol to and through the laser ionisation system, and the time taken to analyse the ionised material. Each laser pulse can be correlated to a pixel on the image of the sample that is subsequently built up, as discussed in more detail below.

In some embodiments, the laser source comprises a laser with a nanosecond pulse duration or an ultrafast laser (pulse duration of 1 ps ($10^{-12}$ s) or quicker, such as a femtosecond laser. Ultrafast pulse durations provide a number of advantages, because they limit heat diffusion from the ablated zone, and thereby provide more precise and reliable ablation craters, as well as minimising scattering of debris from each ablation event. Femtosecond lasers are particularly useful in the systems and apparatus and apparatus described here.

In some instances a femtosecond laser is used as the laser source. A femtosecond laser is a laser which emits optical pulses with a duration below 1 ps. The generation of such short pulses often employs the technique of passive mode locking. Femtosecond lasers can be generated using a number of types of laser. Typical durations between 30 fs and 30 ps can be achieved using passively mode-locked solid-state bulk lasers. Similarly, various diode-pumped lasers, e.g. based on neodymium-doped or ytterbium-doped gain media, operate in this regime. Titanium-sapphire lasers with advanced dispersion compensation are even suitable for pulse durations below 10 fs, in extreme cases down to approximately 5 fs. The pulse repetition rate is in most cases between 10 MHz and 500 MHz, though there are low repetition rate versions with repetition rates of a few megahertz for higher pulse energies (available from e.g. Lumentum (CA, USA), Radiantis (Spain), Coherent (CA, USA)). This type of laser can come with an amplifier system which increases the pulse energy There are also various types of ultrafast fiber lasers, which are also in most cases passively mode-locked, typically offering pulse durations between 50 and 500 fs, and repetition rates between 10 and 100 MHz. Such lasers are commercially available from e.g. NKT Photonics (Denmark; formerly Fianium), Amplitude Systems (France), Laser-Femto (CA, USA). The pulse energy of this type of laser can also be increased by an amplifier, often in the form of an integrated fiber amplifier.

Some mode-locked diode lasers can generate pulses with femtosecond durations. Directly at the laser output, the pulse duration is usually around several hundred femtoseconds (available e.g. from Coherent (CA, USA)).

In some instances, a picosecond laser is used. Many of the types of lasers already discussed in the preceding paragraphs can also be adapted to produce pulses of picosecond range duration. The most common sources are actively or passively mode-locked solid-state bulk lasers, for example a passively mode-locked Nd-doped YAG, glass or vanadate laser. Likewise, picosecond mode-locked lasers and laser diodes are commercially available (e.g. NKT Photonics (Denmark), EKSPLA (Lithuania)).

Alternatively, a continuous wave laser may be used, externally modulated to produce nanosecond or shorter duration pulses.

Typically, the laser beam used for ablation in the laser systems discussed herein has a spot size, i.e., at the sampling location, of 100 µm or less, such as 50 µm or less, 25 µm or less, 20 µm or less, 15 µm or less, or 10 µm or less, such as about 3 µm or less, about 2 µm or less, about 1 µm or less. The distance referred to as spot size corresponds to the longest internal dimension of the beam, e.g. for a circular beam it is the beam diameter, for a square beam it corresponds to the length of the diagonal between opposed corners, for a quadrilateral it is the length of the longest diagonal etc. (as noted above, the diameter of a circular beam with a Gaussian distribution is defined as the distance between the points at which the fluence has decreased to $1/e^2$ times the peak fluence). As an alternative to the Gaussian beam, beam shaping and beam masking can be employed to provide the desired ablation spot. For example, in some applications, a square ablation spot with a top hat energy distribution can be useful (i.e. a beam with near uniform fluence as opposed to a Gaussian energy distribution). This arrangement reduces the dependence of the ablation spot size on the ratio between the fluence at the peak of the Gaussian energy distribution and the threshold fluence. Ablation at close to the threshold fluence provides more reliable ablation crater generation and controls debris generation. Accordingly, the laser system may comprise beam masking and/or beam shaping components, such as a diffractive optical element, arranged in a Gaussian beam to re-shame the beam and produce a laser focal spot of uniform or near-uniform fluence, such as a fluence that varies across the beam by less than ±25%, such as less than ±20%, ±15%, ±10% or less than ±5%. Sometimes, the laser beam has a square cross-sectional shape. Sometimes, the beam has a top hat energy distribution. As set out above, in the context of embodiments of the present invention, the distance referred to as spot size is the longest internal dimension of the beam at the sampling location, i.e. the spot size is the lateral dimension of the beam, so for example, the spot size of a circular beam is the diameter. However, the skilled person will appreciate that the focal spot of an objective lens is a three dimensional volume and that the axial dimensions of a focused spot size are generally longer than the lateral dimensions so that in some instances, the axial dimension of the focal spot may be longer than the distance referred to as 'spot size' in the context of embodiments of the present invention.

When used for analysis of biological samples, in order to analyse individual cells the spot size of laser beam used will depend on the size and spacing of the cells. For example, where the cells are tightly packed against one another (such as in a tissue section) one or more laser sources in the laser system can have a spot size which is no larger than these cells. This size will depend on the particular cells in a sample, but in general the laser spot will have a diameter of less than 4 µm e.g. about 3 µm or less, about 2 µm or less, about 1 µm or less. In order to analyse given cells at a subcellular resolution the system uses a laser spot size which is no larger than these cells, and more specifically uses a laser spot size which can ablate material with a subcellular resolution. The lower the spot size, the greater the resolution resulting image. Sometimes, single cell analysis can be performed using a spot size larger than the size of the cell, for example where cells are spread out on the slide, with space between the cells Here, a larger spot size can be used and single cell characterisation achieved, because the additional ablated area around the cell of interest does not comprise additional cells. The particular spot size used can therefore be selected appropriately dependent upon the size of the cells being analysed. In biological samples, the cells will rarely all be of the same size, and so if subcellular resolution imaging is desired, the ablation spot size should be smaller than the smallest cell, if constant spot size is maintained throughout the ablation procedure. Small spot sizes can be achieved using focusing of laser beams. A laser spot diameter of 1 µm corresponds to a laser focus point (i.e. the diameter of the laser beam at the focal point of the beam) of 1 µm, but the laser focus point can vary by +20% or more due to spatial distribution of energy on the target (for instance, Gaussian beam shape) and variation in total laser energy with respect to the ablation threshold energy.

Laser Ablation Focal Point

To maximise the efficiency of a laser to ablate material from a sample, the sample should be at a suitable position with regard to the laser's focal point, for example at the focal point, as the focal point is where the laser beam will have the smallest diameter and so most concentrated energy. This can be achieved in a number of ways. A first way is that the sample can be moved in the axis of the laser light directed upon it (i.e. up and down the path of the laser light/towards and away from the laser source) to the desired point at which the light is of sufficient intensity to effect the desired ablation. Alternatively, or additionally, lenses can be used to move the focal point of the laser light and so its effective ability to ablate material at the location of the sample, for example by demagnification. The one or more lenses are positioned between the laser and the sample stage. A third way, which can be used alone or in combination with either or both of the two preceding ways, is to alter the position of the laser.

To assist the user of the system in placing the sample at the most suitable location for ablation of material from it, a camera can be directed at the stage holding the sample (discussed in more detail below). Accordingly, the disclosure provides a laser ablation sampling system comprising a camera directed on the sample stage. The image detected by the camera can be focused to the same point at which the laser is focused. This can be accomplished by using the same objective lens for both laser ablation and optical imaging. By bringing the focal point of two into accordance, the user can be sure that laser ablation will be most effective when the optical image is in focus. Precise movement of the stage to bring the sample into focus can be effected by use of piezo activators, as available from Physik Instrumente, Cedrattechnologies, Thorlabs and other suppliers.

Sample Chamber of the Laser Ablation Sampling System

The sample is placed in the sample chamber when it is subjected to laser ablation. The sample chamber comprises a stage, which holds the sample (typically the sample is on a sample carrier). When ablated, the material in the sample forms plumes, and the flow of gas passed through the sample chamber from a gas inlet to a gas outlet carries away the plumes of aerosolised material, including any labelling atoms that were at the ablated location. The gas carries the material to the ionisation system, which ionises the material to enable detection by the detector. The atoms, including the labelling atoms, in the sample can be distinguished by the detector and so their detection reveals the presence or absence of multiple targets in a plume and so a determination of what targets were present at the ablated locus on the sample. Accordingly, the sample chamber plays a dual role in hosting the solid sample that is analysed, but also in being the starting point of the transfer of aerosolised material to the ionisation and detection systems. This means that the gas flow through the chamber can affect how spread out the ablated plume of material becomes as it passes through the system. A measure of how spread out the ablated plume becomes is the washout time of the sample chamber. This figure is a measure of how long it takes material ablated from the sample to be carried out of the sample chamber by the gas flowing through it.

The spatial resolution of the signals generated from laser ablation (i.e. when ablation is used for imaging rather than exclusively for clearing, as discussed below) in this way depends on factors including: (i) the spot size of the laser, as signal is integrated over the total area which is ablated; and the speed with which plumes are generated versus the movement of the sample relative to the laser, and (ii) the speed at which a plume can be analysed, relative to the speed at which plumes are being generated, to avoid overlap of signal from consecutive plumes as mentioned above. Accordingly, being able to analyse a plume in the shortest time possible minimises the likelihood of plume overlap (and so in turn enables plumes to be generated more frequently), if individual analysis of plumes is desired.

Accordingly, a sample chamber with a short washout time (e.g. 100 ms or less) is advantageous for use with the apparatus and methods disclosed herein. A sample chamber with a long washout time will either limit the speed at which an image can be generated or will lead to overlap between signals originating from consecutive sample spots (e.g. Kindness et al. (2003; Clin Chem 49:1916-23), which had signal duration of over 10 seconds). Therefore aerosol washout time is a key limiting factor for achieving high resolution without increasing total scan time. Sample chambers with washout times of ≤100 ms are known in the art. For example, Gurevich & Hergenroder (2007; J. Anal. At. Spectrom., 22:1043-1050) discloses a sample chamber with a washout time below 100 ms. A sample chamber was disclosed in Wang et al. (2013; Anal. Chem. 85:10107-16) (see also WO 2014/146724) which has a washout time of 30 ms or less, thereby permitting a high ablation frequency (e.g. above 20 Hz) and thus rapid analysis. Another such sample chamber is disclosed in WO 2014/127034. The sample chamber in WO 2014/127034 comprises a sample capture cell configured to be arranged operably proximate to the target, the sample capture cell including: a capture cavity having an opening formed in a surface of the capture cell, wherein the capture cavity is configured to receive, through the opening, target material ejected or generated from the laser ablation site and a guide wall exposed within the capture cavity and configured to direct a flow of the carrier gas within the capture cavity from an inlet to an outlet such that at least a portion of the target material received within the capture cavity is transferrable into the outlet as a sample. The volume of the capture cavity in the sample chamber of WO 2014/127034 is less than 1 $cm^3$ and can be below 0.005 $cm^3$. Sometimes the sample chamber has a washout time of 25 ms or less, such as 20 ms, 10 ms or less, 5 ms or less, 2 ms or less, 1 ms, less or 500 µs or less, 200 µs or less, 100 µs or less, 50 µs or less, or 25 µs or less. For example, the sample chamber may have a washout time of 10 µs or more. Typically, the sample chamber has a washout time of 5 ms or less.

For completeness, sometimes the plumes from the sample can be generated more frequently than the washout time of the sample chamber, and the resulting images will smear accordingly (e.g. if the highest possible resolution is not deemed necessary for the particular analysis being undertaken).

The sample chamber typically comprises a translation stage which holds the sample (and sample carrier) and moves the sample relative to a beam of laser radiation. When a mode of operation is used which requires the direction of laser radiation through the sample carrier to the sample, the stage holding the sample carrier should also be transparent to the laser radiation used.

Thus, the sample may be positioned on the side of the sample carrier (e.g., glass slide) facing the laser radiation as it is directed onto the sample, such that ablation plumes are released on, and captured from, the same side as that from which the laser radiation is directed onto the sample. Alternatively, the sample may be positioned on the side of the sample carrier opposite to the laser radiation as it is directed onto the sample (i.e. the laser radiation passes through the sample carrier before reaching the sample), and ablation plumes are released on, and captured from, the opposite side to the laser radiation.

One feature of a sample chamber, which is of particular use where specific portions in various discrete areas of sample are ablated, is a wide range of movement in which the sample can be moved in the x and y (i.e. horizontal) axes in relation to the laser (where the laser beam is directed onto the sample in the z axis), with the x and y axes being perpendicular to one another. More reliable and accurate relative positions are achieved by moving the stage within the sample chamber and keeping the laser's position fixed in the laser ablation sampling system of the apparatus. The greater the range of movement, the more distant the discrete ablated areas can be from one another. The sample is moved in relation to the laser by moving the stage on which the sample is placed. Accordingly, the sample stage can have a range of movement within the sample chamber of at least 10 mm in the x and y axes, such as 20 mm in the x and y axes, 30 mm in the x and y axes, 40 mm in the x and y axes, 50 mm in the x and y axes, such as 75 mm in the x and y axes. Sometimes, the range of movement is such that it permits the entire surface of a standard 25 mm by 75 mm microscope slide to be analysed within the chamber. Of course, to enable subcellular ablation to be achieved, in addition to a wide range of movement, the movement should be precise. Accordingly, the stage can be configured to move the sample in the x and y axes in increments of less than 10 µm, such as less than 5 µm, less than 4 µm, less than 3 µm, less than 2 µm, 1 µm, or less than 1 µm, less than 500 nm, less than 200 nm, less than 100 nm. For example, the stage may be configured to move the sample in increments of at least 50 nm. Precise stage movements can be in increments of about 1 µm, such as 1 µm±0.1 µm. Commercially available microscope stages can be used, for example as available from Thorlabs, Prior Scientific, and Applied Scientific Instrumentation. Alternatively, the motorised stage can be built from components, based on positioners providing the desired range of movement and suitably fine precision movement, such as the SLC-24 positioners from Smaract. The movement speed of the sample stage can also affect the speed of the analysis. Accordingly, the sample stage has an operating speed of greater than 1 mm/s, such as 10 mm/s, 50 mm/s or 100 mm/s.

Naturally, when a sample stage in a sample chamber has a wide range of movement, the sample chamber must be sized appropriately to accommodate the movements of the stage. Sizing of the sample chamber is therefore dependent on size of the sample to be involved, which in turn determines the size of the mobile sample stage. Exemplary sizes of sample chamber have an internal chamber of 10×10 cm, 15×15 cm or 20×20 cm. The depth of the chamber may be 3 cm, 4 cm or 5 cm. The skilled person will be able to select appropriate dimensions following the teaching herein. The internal dimensions of the sample chamber for analysing biological samples using a laser ablation sampler must be bigger than the range of movement of the sample stage, for example at least 5 mm, such as at least 10 mm. This is because if the walls of the chamber are too close to the edge of the stage, the flow of the carrier gas passing through the chamber which takes the ablated plumes of material away from the sample and into the ionisation system can become turbulent. Turbulent flow disturbs the ablated plumes, and so instead of remaining as a tight cloud of ablated material, the plume of material begins to spread out after it has been ablated and carried away to the ionisation system of the apparatus. A broader peak of the ablated material has negative effects on the data produced by the ionisation and detection systems because it leads to interference due to peak overlap, and so ultimately, less spatially resolved data, unless the rate of ablation is slowed down to such a rate that it is no longer experimentally of interest.

As noted above, the sample chamber comprises a gas inlet and a gas outlet that takes material to the ionisation system. However, it may contain further ports acting as inlets or outlets to direct the flow of gas in the chamber and/or provide a mix of gases to the chamber, as determined to be appropriate by the skilled artisan for the particular ablative process being undertaken.

Camera

In addition to identifying the most effective positioning of the sample for laser ablation, the inclusion of a camera (such as a charged coupled device image sensor based (CCD) camera or an active pixel sensor based camera), or any other light detecting means in a laser ablation sampling system enables various further analyses and techniques. A CCD is a means for detecting light and converting it into digital information that can be used to generate an image. In a CCD image sensor, there are a series of capacitors that detect light, and each capacitor represents a pixel on the determined image. These capacitors allow the conversion of incoming photons into electrical charges. The CCD is then used to read out these charges, and the recorded charges can be converted into an image. An active-pixel sensor (APS) is an image sensor consisting of an integrated circuit containing an array of pixel sensors, each pixel containing a photodetector and an active amplifier, e.g. a CMOS sensor.

Laser Ablation

Generally, laser ablation is performed in a manner as set out previously, for example in Giesen et al, 2014 and WO2014169394, in light of the modifications related herein (e.g. it is not mandatory to use an ICP to ionize the sample material, nor to use a TOF MS detector). For instance, the methods may also be performed but replacing mass spectrometry detection with OES detection, as discussed below.

Laser Ionisation System

Previous mass cytometry apparatus, and many previous mass spectrometer apparatus, have employed an inductively coupled plasma (ICP) as the system for ionising material from the sample (i.e. as the ion source of ions which are detected by the MS). However, ion transfer efficiency in ICP-MS is far below unity. This is to say that the number of ions detected from the material introduced into the ICP is far below that expected for complete ionisation of the material. Low transfer efficiency is related to the problem of the space charge generated by ions of the carrier gas (typically argon). As explained below, the space charge effect can result in the repulsion of densely packed ions or in the presence of particles with charges of opposite type the space charge can lead to the formation of neutral species, which in turn cannot be detected by the mass spectrometer. Many of the ions in an ICP come from the argon gas used to maintain the plasma at the end of the torch (note the additional argon gas inflows in the torch of FIG. 1 (labelled with *) in addition to the flow transporting the material for ionisation). An approach that generates elemental ions without the presence of the bulk of argon carrier ions and electrons originating from the carrier gas could facilitate better instrument sensitivity.

The inventors have identified that instead of using ICP as the ionisation system for mass cytometry and mass spectrometry, like in standard mass cytometers, it is instead possible to use a laser ionisation system to ionise the sample. The inventors have determined that any suitable laser that effects conversion of the sample material presented in the form of aerosols or vapours into elemental ions can be used in the laser ionisation system providing it does not generate too many ions from the carrier gas and that picosecond and femtosecond lasers are useful in the laser ionisation system of embodiments of the present invention (with femtosecond lasers being particularly useful). Laser ionisation provides advantages because the energy in the laser light fragments, atomises and ionises the sample material without adding a significant amount of ions of the carrier gas to the ion beam. This ionisation system is compatible with both liquid samples and solid samples.

Applications where this approach might be particularly advantageous include imaging of biological samples by imaging mass cytometry. In these applications the biological sample is interrogated by a laser pulse (most likely from a second laser in the setup) to produce a plume of ablated material for each pixel of interest on the biological sample. The plume produced typically carries vapours and nanometer scale aerosols from the interrogated area. According to embodiments of the present invention, the vapours and aerosols can be ionised directly by subjecting them to laser irradiation of sufficient intensity to produce elemental ions from the plume material, as explained below in more detail.

By reference to FIG. 2, typically, the laser ionisation system (200) comprises an ionisation system conduit (210) and a laser system (220), arranged so that the laser system is directed into the ionisation system conduit (210) to enable ionisation of material passing through the ionisation system conduit by laser light (221) emitted from the laser (220). One end of the ionisation system conduit is in communication with the sampler (100) of the apparatus, and the opposite end of the conduit is in communication with the mass spectrometer (300) of the apparatus. Material from the sampler is therefore ionised by the laser light as it is carried to the mass spectrometer.

Lasers for Use in the Laser Ionisation System

Generally, lasers useful for ionisation include those which supply energy on the scale of a few microJoules of energy per pulse, but which are capable of producing those pulses with high frequency. The laser is for generating elemental ions from the sample material. The elemental ions generated can then be analysed by the mass spectrometer in the apparatus. The laser may be a picosecond laser or a femtosecond laser. In some embodiments the laser is a femtosecond laser.

The femtosecond laser may be a solid state laser. Passively mode-locked solid-state bulk lasers can emit high-quality ultrashort pulses with typical durations between 30 fs and 30 ps. Examples of such lasers include diode-pumped lasers, such as those based on neodymium-doped or ytterbium-doped crystals. Titanium-sapphire lasers can be used for pulse durations below 10 fs, in extreme cases down to approximately 5 fs (e.g. Octavius Ti:Sapphire Lasers, available from Thorlabs). The pulse repetition rate is in most cases between 1 kHz and 500 MHz.

The femtosecond laser may be a fiber laser. Various types of ultrafast fiber lasers, which may also be passively mode-locked, typically offer pulse durations between 50 and 500 fs, repetition rates between 0.10 and 100 MHz, and average power between a few milliwatts and several watts (femtosecond fiber lasers are commercially available from Toptica, IMRA America, Coherent, Inc.).

The femtosecond laser may be a semiconductor laser. Some mode-locked diode lasers can generate pulses with femtosecond durations. Directly at the laser output, the pulses durations are usually at least several hundred femtoseconds, but with external pulse compression, much shorter pulse durations can be achieved.

It is also possible to passively mode-lock vertical external-cavity surface-emitting lasers (VECSELs); these are interesting particularly because they can deliver a combination of short pulse durations, high pulse repetition rates, and sometimes high average output power, whereas they are not suitable for high pulse energies.

Femtosecond lasers suitable for use in the systems and methods disclosed herein also include colour centre lasers and free electron lasers.

In some embodiments the laser is adapted to produce a pulse of nanosecond, picosecond or femtosecond scale pulse duration. For example, the laser may have a duration of 500 fs or less, such as 400 fs or less, 300 fs or less, 200 fs or less, 100 fs or less, 50 fs or less, 45 fs or less, 25 fs or less, 20 fs or less or 10 fs or less. A femtosecond laser is adapted to produce pulses with a duration of less than 1 ps.

In some embodiments, the laser is adapted to have a pulse repetition rate of at least 100,000 Hz, such as at least 1 MHz, at least 2 MHz, at least 3 MHz, at least 4 MHz, at least 5 MHz, at least 10 MHz, at least 20 MHz, at least 50 MHz, at least 100 MHz, at least 200 MHz, at least 500 MHz or 1 GHz or more.

In some embodiments, the laser is adapted to have beam width ($1/e^2$) of 100 μm or less, such as 50 μm or less, 20 μm or less, 10 μm or less, or 5 μm or less at its focal point. The focal point of the laser is where the beam's energy is most concentrated and accordingly where the greatest ionisation is achieved.

In some embodiments, the laser is adapted to have a pulse energy of between 1 nanoJoule up to 50 milliJoules. Lasers for assisting in the sputtering of material or for ablation of material can be adapted to have a pulse energy of between 1 nanoJoule and 100 microJoules, such as between 10 nanoJoules and 100 microJoules, between 100 nanoJoules and 10 microJoules, between 500 nanoJoules and 5 microJoules, such as around 1 microJoule, around 2 microJoules, around 3 microJoules or around 4 microJoules. Laser for post ionisation can be adapted to have a pulse energy of between 1 milliJoule and 50 milliJoules, such as between 5 milliJoules and 40 milliJoules, 10 milliJoules and 30 milliJoules, 20 milliJoules and 35 milliJoules, or around 25 milliJoules or 35 milliJoules.

In some embodiments, the laser is adapted to have a pulse energy of around 1 milliJoule, to have a pulse repetition rate of at least 10 MHz, and to produce pulses with a duration of less than 100 fs, such as 50 fs or less, 45 fs or less, 25 fs or less, 20 fs or less or 10 fs or less.

Beyond the advantages of reducing the number of ions from the carrier gas, the laser ionisation system can be adapted to further increase ionisation efficiency by avoiding space charge effects through other mechanisms. For example, the laser ionisation system can be adapted to utilise multiple laser pulses of the ionising laser to ionise the content of a single plume or particle. If multiple pulses are used, then the amount of ions generated by any one pulse is reduced.

As noted above, if a large amount of positive and negative charges is created in a small volume the motion of the ions formed will be dominated by the local fields resulting from the space charge induced by the ions and electrons. If there are too many charged ions in a small volume, external fields, such as the fields from ion optics present in mass spectrometers used to direct the resulting ions to the detector for detection, will not be effective at separating positive and negative charges and such ion clouds will eventually neutralise reducing ionisation efficiency. For example, an ion cloud on a scale of 10 μm (in diameter) containing 10000 elemental charges creates an electrostatic potential that is about 3 V. Since a few eV is the energy holding the electrons to the atoms it is also the likely energy level of free electrons after ionisation. As a result, the ion density on the scale of 10000 ions in a volume on the 10 micrometer scale is near the limit where the space charge behaviour starts to dominate.

In addition to using more pulses to ionise the content of a single plume or particle, the inventors have also identified further techniques and adaptations to address this problem by controlling the amount of material being ionised by a pulse of the ionising laser. These techniques may be used, alone in combination with one another, and optionally with the use of multiple pulses of the ionisation laser to ionise the content of a single plume or particle. This results in fewer ions being generated, and so meaning that the ion optics can act to separate the charges before they recombine and neutralise.

Where the sampler is a laser ablation system, then the amount of material per plume can be controlled by ablating only a small amount of material to generate each plume for ionisation by the laser ionisation system. There are two principal ways for doing this. The first is ablating a small spot of material from the sample for the generation of each plume, e.g. less than 4 μm, such as less than 3 μm, less than 2 μm, less than 1 μm, less than 500 nm, less than 400 nm, less than 300 nm, less than 200 nm or 100 nm or less. Usually the spot size is 1 μm or less. The second is to control the depth of the ablation spot by appropriate configuration of the ablating laser e.g. by modulating the power per pulse. The depth of the resulting crater can be less than 500 nm, less than 400 nm, less than 300 nm, less than 200 nm, less than 100 nm, less than 50 nm or 20 nm or less (i.e. each laser pulse ablates 500 nm, less than 400 nm, less than 300 nm, less than 200 nm, less than 100 nm or 50 nm or less of material from the sample within the spot diameter of the laser pulse). If the total depth of the sample is greater than the depth of sample ablated per laser pulse, then more than one pulse may be directed at the same location on a sample to fully ablate that location of the sample.

A plume originating from a spot of 1×1 μm with ablated to a depth of 100 nm will contain approximately $10^{10}$ atoms. In this instance, $10^{10}$ atoms can be subdivided into $10^6$ portions each containing $10^4$ atoms. In that case each of the portions can be ionised by direct laser ionisation such as femtosecond laser ionisation based on tunnelling or multiphoton effects. This kind of ionisation can result in near 100% ionisation efficiency, therefore meaning that $10^4$ ions can be generated from $10^4$ atoms. This number of ions is still within the space charge boundary ensuring reasonable efficiency of separating positive and negative particles. Reducing the amount of material ablated will provide even further advantages, because with ablation spots of 300 nm by 300 nm and 100 nm thickness of the sample the amount of ablated material is reduced 10-fold and the number of ionisation laser pulses required to ionise the ablation plume is reduced to $10^5$.

If this set up were used for imaging mass cytometry or imaging mass spectrometry, one pulse of the ablation laser to generate the plume from the sample will be accompanied by $10^5$ pulses of the ionisation laser to ionise the ablation plume, in the expectation of achieving near complete ionisation of the sample. Smaller diameters of ablation spots and/or shallower depths of ablation will reduce the number of pulses from the laser of the laser ionisation system needed to ablate the ablated plume. In some embodiments, therefore the laser of the laser ionisation system is configured to produce a pulse at a repetition rate $10^3$ times greater than the repetition rate of the laser ablation system, such as $10^4$ times greater or more, $5 \times 10^4$ greater or more, $10^5$ times greater or more, $5 \times 10^5$ times greater or more, $10^6$ times greater, or more than $10^6$ times greater.

If a lesser degree of ionisation is acceptable, e.g. 10% ionisation, then the corresponding pulse rate of the ionisation laser can be reduced. A reduced degree of ionisation may be acceptable, for example when analysing biological samples, in instances where more than one copy of elemental tag is used to mark a target molecule. For instance, if 10 or more copies of an elemental tag are covalently linked to an antibody that binds to a target antigen, then 10% ionisation may be acceptable because at least one of the elemental tags will be ionised and so detected.

Ionisation System Conduit

To maximise ionisation, the plume generated by ablation can be broadened, so that it can be ionised by a series of pulses from the ionisation laser. Several parameters can be employed to increase the volume of the plume. Accordingly, in one embodiment of the apparatus, the sampler comprises a laser ablation system configured to produce a plume, and wherein the apparatus includes an arrangement to increase the plume volume prior to laser ionisation.

One parameter is the pressure in the ablation chamber of the ablation system. When a sample is ablated, the volume of the resulting ablation plume when it stops expanding is inversely proportional to the pressure in the ablation chamber (from which the ionisation system conduit carries the ablated plume). Accordingly, the ablation chamber can be maintained at less than atmospheric pressure. For instance, operating at 0.5 atmosphere instead of 1 atmosphere pressure leads to an increase of gaseous volume of the ablation plume by 2-fold before the plume enters the ionisation system conduit. The ablation chamber may be operated at less than 0.5 atmospheres, for example less than 0.1 or less than 0.05 atmospheres.

A second parameter is the residence time of the sample in the ionisation system conduit between the ablation chamber and the point at which ionisation occurs. As the ablation plume is carried along the conduit from the ablation chamber, it diffuses, and the degree of diffusion is proportional to the time that the plume spends in the gas flow (the plume's residence time). Accordingly, a longer conduit will result in a more diffuse and thus broader plume which should be more suitable to ionise efficiently (fewer ions are generated per unit volume when a more diffuse plume is ionised, and therefore this reduces the influence of charge neutralisation effects). Likewise, a slow flow of gas in the conduit increases residence time and so permits greater diffusion of the ablation plume. This is turn is controllable by the volume of gas introduced into the mass cytometer or mass spectrometer system per unit time, and the diameter of the conduit between the ablation chamber and the ionisation system. Variation of these parameters to control diffusion appropriately is readily performed by the skilled person.

In some embodiments, the reshaping of the plume of sample material to be ionised can be performed as well as, or instead of, relying on diffusion to reduce space-charge effects. The length of time taken to analyse the material from an event (e.g. an individual ablation plume) is dependent on how diffuse the plume of material is, and thus how diffuse the resulting cloud of ions is, with more diffuse clouds taking longer to analyse.

Since the dimensions of the volume that can be ionised by the femtosecond laser is typically in the micrometer scale (and therefore typically smaller than the plume generated by ablation, of a 1 µm spot for example) the gaseous sample material can be reshaped from the spherical shape produced by diffusion into the shape of an elongated string with a diameter of only few micrometers to maximise the efficiency of ionisation.

A simple approach to reshaping of the plume of sample material is utilising an ionisation system conduit that is tapered towards the output. This is illustrated in FIG. 3, A through D. In this figure, a plume of sample material (400) is illustrated proceeding along the ionisation system conduit (210) in the carrier gas flowing along the conduit. As the cloud passes into the tapering (420) of the ionisation system conduit (210), its width narrows but its length increases. For instance, the ionisation system conduit internal diameter can be x µm at the input end of the conduit but it can be tapered down to x/10 µm near the output end (e.g. 300 µm at the input end and 30 µm at the output end). The tapering may be along the length of the ionisation system conduit, or the tapering may be of only a portion of the conduit (that is to say that the conduit has the same internal diameter for a first portion of its length and followed by a second portion in which the internal diameter is reduced). If the plume in the ionisation system conduit expands to 100 µm in diameter in the first portion, nearly the same ratio of diameters will be maintained as the plume is going through the tapered portion. Thus, if diameter at the start of the taper is 10-fold greater than at the end of the taper, the plume diameter following the tapered portion will be 10 µm. At the same time, in this instance, the plume length will increase from 100 µm to 10 mm due to conservation of plume volume. Thus in some embodiments, the ionisation system, conduit comprises a tapered portion, wherein the internal diameter of the conduit is reduced over the taper by 2-fold or more, such as 2-fold or more, 3-fold or more, 4-fold or more, 5-fold or more, 10-fold or more, 20-fold or more or 50-fold or more. The internal diameter is the measure of the longest cross-section through the conduit. E.g. if the conduit is circular, the internal diameter is simply the diameter of the circle, but if the conduit is a rectangle, it is the diameter.

In some embodiments the flow of the carrier gas in the tapered portion is nearly sonic or even supersonic. This provides the flow of highest velocity for stretching the plume. It also reduces the residence time in the tapered portion which in turns minimises undesirable diffusion widening that could lead to some loss of ions in this portion of the apparatus. In some embodiments, the ionisation laser is arranged to ionise the sample at this narrowest point (where the gas is at the highest speed in the taper). A faster flow velocity enables a faster repetition rate of laser used to ionise the sample material, without hitting the portion of the sample that has been ionised by the previous pulse. By doing so, the plume can be subdivided into smaller portions suitable for minimising space-charge effects leading to neutralisation post-ionisation, as discussed above.

Maximising Efficiency of Laser Light Usage

By appropriate design of laser optics and the ionisation system conduit, it is possible to direct the laser of the laser ionisation system so that the light reflects back through the sample material passing through and/or exiting the ionisation system conduit. The laser light therefore can be focused in the sample material multiple times, thereby making the most efficient use of the laser light for ionising sample material passing through the conduit and/or exiting the conduit.

Accordingly, in some embodiments the laser ionisation system further comprises a reflector arrangement to cause laser light generated by the laser to pass through the sample a plurality of times. Sometimes, the reflector arrangement comprises one or more reflectors which are shaped to provide multiple focal points within the ionisation conduit, and sometimes they are arranged to provide multiple focal points at the exit of the ionisation conduit (typically where the sample material has not expanded from the narrow diameter shape into which it has been forced by the ionisation system conduit). This is illustrated in FIGS. 4 and 5. In FIG. 4, laser light (221) is illustrated being reflected within the ionisation conduit (210) following the taper (420), by reflectors arranged such that multiple focal points are formed (430) along the conduit.

To maximise use of the laser light, the light can be introduced into a multipass cell. Typical multiple pass cells utilise convex reflectors (500) arranged so that the light is reflected a number of times through the same space in the ionisation conduit (210) to ionise sample material (400) passing along the conduit. In doing so, the laser light can be focused at multiple focal points within the ionisation conduit (FIG. 5A) or at the exit of the tapered end of the conduit, between the conduit and the skimmer or sampler cone of the MS (520) (FIG. 5B), and therefore ionisation of sample material can be effected numerous times using the same laser light to maximise absorption by the sample to generate elemental ions for analysis by the downstream MS. Accordingly, in some embodiments, the reflector arrangement comprises at least one convex reflector. Multiple of the convex reflector arrangement as illustrated schematically in FIG. 5 may be arranged along a length of the ionisation conduit to increase the number of focal points. The focal points are not labelled on FIG. 5, but like in FIG. 4, the reflectors are arranged such that the focus is in the centre of the conduit, where the amount of material to be ionised is the greatest.

In some embodiments, the laser light is launched at the wide portion of the conduit, which acts a waveguide, such that energy density only reaches levels suitable for ionisation in the in the tapered portion. This is illustrated in FIG. 6. Here, the laser light (211) leaves the laser (210) and is reflected from the internal surface of the taper as it narrows, until a density of laser light is reached towards the narrow end of the taper that can ionise sample material (610).

With reference to FIG. 7, in some embodiments, the tapered conduit is flared out (710) after it narrows. Laser light (221) is launched at the end of the taper (420) from the flare-out side (the ionisation laser is positioned to direct laser light from the flare-out side of the taper). The angle of the flare out can be tailored to suit the numerical aperture of the objective lens being used to focus the laser light. Wider angles allow the use of a higher numerical aperture lens, which assists in minimising the diameter of the laser focal point. The ions resulting from ionisation continue along the direction of the gas flow. The resulting ions can then be deflected by ion optics to alter their trajectories from the direction of the gas flow to avoid impinging on the objective lens. In some embodiments, the objective lens can have a hole in the middle to allow the ions to pass.

Ionisation of Liquid Samples by a Multiple Laser System

In some instances where the sample is a liquid sample, the particles, such as cells or viruses, are broken up into smaller particles by a first laser upstream of the ionisation laser. The ionisation laser can then act to ionise the particles to generate elemental ions in line with the description above. The laser may act to break the cells up while they are still in a liquid. Alternatively, the cells may be fragmented in the gas phase. Here, a liquid sample may be nebulised to produce gas phase cells, and the gas phase cells broken down by the first laser into fragments that can then be ionised by the ionisation laser. Another way of fragmentation in the gas phase would be to introduce cells into a flow of gas using a drop-on-demand device (http://www.microfab.com/dispensing-devices, http://www.polypico.com/wp-content/uploads/2015/06/Poly-Pico_Brochure_-2015.pdf or a device based on an inkjet-style printer head. In some embodiments, more than one laser is used to break down the cell into fragments that are then ionised by the ionisation laser, such as two, three, four or five or more lasers. For example, a first laser can break down the sample into fragments with a first diameter, and a second laser positioned downstream of the first laser can be used to break the fragments of a first diameter into fragments of an even smaller diameter. Where the number of lasers is greater than two, the same principle applies, with each laser breaking the fragments down into smaller fragments. The fragments before ionisation will be in a cloud of material that can be manipulated in the same way as the plume discussed above, in particular when discussing a tapered conduit using the laser ablation embodiment as an example. All features discussed above in relation to that apparatus can equally be applied to the analysis of single cells or particles in a liquid sample, e.g. in a mass cytometer.

Laser Ablation with Laser Ionisation

As discussed above, when the sampler is a laser ablation system, the sampler is configured to generate a plume of sample material, which the laser ionisation system is configured to ionise. In some embodiments, the laser ionisation system is configured generate multiple laser pulses for ionising a single plume. In some embodiments, the laser ionisation system is configured to produce a pulse at a repetition rate $10^3$ times greater than the repetition rate of the laser ablation system, such as $10^4$ times greater or more, $5\times10^4$ greater or more, $10^5$ times greater or more, $5\times10^5$ times greater or more, $10^6$ times greater, or more than $10^6$ times greater.

In some embodiments, the apparatus comprises a single laser which is adapted to ablate the solid sample to generate plumes and which is the laser of the laser ionisation system that ionises the plumes of the sample. In this arrangement, the repetition rate of the laser pulses in the laser ionisation system must often be several orders of magnitude greater than the repetition rate of the laser in the ablation chamber to generate the plumes of material that are then ionised. Accordingly, in embodiments where the same laser is used for ablation and ionisation, the apparatus further comprises a pulse picker (available from Del Mar photonics, KMLabs, EKSMA Optics), configured to control the laser pulses directed to the ablation chamber. In some embodiments, the apparatus comprises a laser pulse power controller module, programmed to control the power of laser pulses for ablation and for ionisation. In some embodiments, the apparatus comprises two optical attenuators (commercially available from Thorlabs, Newport, etc.), one for ablation laser pulses and one for ionisation laser pulses, to control the power for each kind of pulse independently.

Mass Detector System

Exemplary types of mass detector system include quadrupole, time of flight (TOF), magnetic sector, high resolution, single or multicollector based mass spectrometers. A magnetic sector instrument is particularly suited for a high rate of recording of 1 megapixel per second and above.

The time taken to analyse the ionised material will depend on the type of mass analyser which is used for detection of ions. For example, instruments which use Faraday cups are generally too slow for analysing rapid signals. Overall, the desired imaging speed, resolution and degree of multiplexing will dictate the type(s) of mass analyser which should be used (or, conversely, the choice of mass analyser will determine the speed, resolution and multiplexing which can be achieved).

Mass spectrometry instruments that detect ions at only one mass-to-charge ratio (m/Q, commonly referred to as m/z in MS) at a time, for example using a point ion detector, will give poor results in imaging detecting. Firstly, the time taken to switch between mass-to-charge ratios limits the speed at which multiple signals can be determined, and secondly, if ions are at low abundance then signals can be missed when the instrument is focused on other mass-to-charge ratios. Thus it is preferred to use a technique which offers substantially simultaneous detection of ions having different m/Q values.

Detector Types

Quadrupole Detector

Quadrupole mass analysers comprise four parallel rods with a detector at one end. An alternating RF potential and fixed DC offset potential is applied between one pair of rods and the other so that one pair of rods (each of the rods opposite each other) has an opposite alternative potential to the other pair of rods. The ionised sample is passed through the middle of the rods, in a direction parallel to the rods and towards the detector. The applied potentials affect the trajectory of the ions such that only ions of a certain mass-charge ratio will have a stable trajectory and so reach the detector. Ions of other mass-charge ratios will collide with the rods.

Magnetic Sector Detector

In magnetic sector mass spectrometry, the ionised sample is passed through a curved flight tube towards an ion detector. A magnetic field applied across the flight tube causes the ions to deflect from their path. The amount of deflection of each ion is based on the mass to charge ratio of each ion and so only some of the ions will collide with the detector—the other ions will be deflected away from the detector. In multicollector sector field instruments, an array of detectors is be used to detect ions of different masses. In some instruments, such as the ThermoScientific Neptune Plus, and Nu Plasma II, the magnetic sector is combined with an electrostatic sector to provide a double-focusing magnetic sector instrument that analyses ions by kinetic energy, in addition to mass to charge ratio. In particular those multidetectors having a Mattauch-Herzog geometry can be used (e.g. the SPECTRO MS, which can simultaneously record all elements from lithium to uranium in a single measurement using a semiconductor direct charge detector). These instruments can measure multiple m/Q signals substantially simultaneously. Their sensitivity can be increased by including electron multipliers in the detectors. Array sector instruments are always applicable, however, because, although they are useful for detecting increasing signals, they are less useful when signal levels are decreasing, and so they are not well suited in situations where labels are present at particularly highly variable concentrations.

Time of Flight (TOF) Detector

A time of flight mass spectrometer comprises a sample inlet, an acceleration chamber with a strong electric field applied across it, and an ion detector. A packet of ionised sample molecules is introduced through the sample inlet and into the acceleration chamber. Initially, each of the ionised sample molecules has the same kinetic energy but as the ionised sample molecules are accelerated through the acceleration chamber, they are separated by their masses, with the lighter ionised sample molecules travelling faster than heaver ions. The detector then detects all the ions as they arrive. The time taking for each particle to reach the detector depends on the mass to charge ratio of the particle.

Thus a TOF detector can quasi-simultaneously register multiple masses in a single sample. In theory TOF techniques are not ideally suited to ICP ion sources because of their space charge characteristics, but TOF instruments can in fact analyse an ICP ion aerosol rapidly enough and sensitively enough to permit feasible single-cell imaging. Whereas TOF mass analyzers are normally unpopular for atomic analysis because of the compromises required to deal with the effects of space charge in the TOF accelerator and flight tube, tissue imaging according to the subject disclosure can be effective by detecting only the labelling atoms, and so other atoms (e.g. those having an atomic mass below 100) can be removed. This results in a less dense ion beam, enriched in the masses in (for example) the 100-250 dalton region, which can be manipulated and focused more efficiently, thereby facilitating TOF detection and taking advantage of the high spectral scan rate of TOF. Thus rapid imaging can be achieved by combining TOF detection with choosing labelling atoms that are uncommon in the sample and ideally having masses above the masses seen in an unlabelled sample e.g. by using the higher mass transition elements. Using a narrower window of label masses thus means that TOF detection to be used for efficient imaging.

Suitable TOF instruments are available from Tofwerk, GBC Scientific Equipment (e.g. the Optimass 9500 ICP-TOFMS), and Fluidigm Canada (e.g. the CyTOF™ and CyTOF™2 instruments). These CyTOF™ instruments have greater sensitivity than the Tofwerk and GBC instruments and are known for use in mass cytometry because they can rapidly and sensitively detect ions in the mass range of rare earth metals (particularly in the m/Q range of 100-200; see Bandura et al. (2009; *Anal. Chem.*, 81:6813-22)). Thus these are preferred instruments for use with the disclosure, and they can be used for imaging with the instrument settings already known in the art e.g. Bendall et al. (2011; Science 332, 687-696) & Bodenmiller et al. (2012; *Nat. Biotechnol.* 30:858-867). Their mass analysers can detect a large number of markers quasi-simultaneously at a high mass-spectrum acquisition frequency on the timescale of high-frequency laser ablation or sample desorption. They can measure the abundance of labelling atoms with a detection limit of about 100 per cell, permitting sensitive construction of an image of the tissue sample. Because of these features, mass cytometry can now be used to meet the sensitivity and multiplexing needs for tissue imaging at subcellular resolution. By combining the mass cytometry instrument with a high-resolution laser ablation sampling system and a rapid-transit low-dispersion sample chamber it has been possible to permit construction of an image of the tissue sample with high multiplexing on a practical timescale.

The TOF may be coupled with a mass-assignment corrector. The vast majority of ionisation events generate $M^+$ ions, where a single electron has been knocked out of the atom. Because of the mode of operation of the TOF MS there is sometimes some bleeding (or cross-talk) of the ions of one mass (M) into the channels for neighbouring masses (M±1), in particular where a large number of ions of mass M are entering the detector (i.e. ion counts which are high, but not so high that an ion deflector positioned between the sampling ionisation system and MS would prevent them from entering the MS, if the apparatus were to comprise such an ion deflector). As the arrival time of each $M^+$ ion at the detector follows a probability distribution about a mean (which is known for each M), when the number of ions at mass $M^+$ is high, then some will arrive at times that would normally be associated with the M−1⁺ or M+1⁺ ions. However, as each ion has a known distribution curve upon entering the TOF MS, based on the peak in the mass M channel it is possible to determine, the overlap of ions of mass M into the M±1 channels (by comparison to the known peak shape). The calculation is particularly applicable for TOF MS, because the peak of ions detected in a TOF MS is asymmetrical. Accordingly it is therefore possible to correct the readings for the M−1, M and M+1 channels to appropriately assign all of the detected ions to the M channel. Such corrections have particular use in correcting imaging data due to the nature of the large packets of ions produced by sampling and ionisation systems such as those disclosed herein involving laser ablation (or desorption as discussed below) as the techniques for removing material from the sample. Programs and methods for improving the quality of data by de-convoluting the data from TOF MS are discussed in WO2011/098834, U.S. Pat. No. 8,723,108 and WO2014/091243.

Constructing an Image

The apparatus above can provide signals for multiple atoms in packets of ionised sample material removed from the sample. Detection of an atom in a packet of sample material reveals its presence at the position of ablation, be that because the atom is naturally present in the sample or because the atom has been localised to that location by a labelling reagent. By generating a series of packets of ionised sample material from known spatial locations on the sample's surface the detector signals reveal the location of the atoms on the sample, and so the signals can be used to construct an image of the sample. By labelling multiple targets with distinguishable labels it is possible to associate the location of labelling atoms with the location of cognate targets, so the method can build complex images, reaching levels of multiplexing which far exceed those achievable using traditional techniques such as fluorescence microscopy.

Assembly of signals into an image will use a computer and can be achieved using known techniques and software packages. For instance, the GRAPHIS package from Kylebank Software may be used, or other packages such as TERAPLOT can also be used. Imaging using MS data from techniques such as MALDI-MSI is known in the art e.g. Robichaud et al. (2013; *J Am Soc Mass Spectrom* 24 5:718-21) discloses the 'MSiReader' interface to view and analyze MS imaging files on a Matlab platform, and Klinkert et al. (2014; Int J Mass Spectrom http://dx.doi.org/10.1016/j.ijms.2013.12.012) discloses two software instruments for rapid data exploration and visualization of both 2D and 3D MSI data sets in full spatial and spectral resolution e.g. the 'Datacube Explorer' program.

Images obtained using the methods disclosed herein can be further analysed e.g. in the same way that IHC results are analysed. For instance, the images can be used for delineating cell sub-populations within a sample, and can provide information useful for clinical diagnosis. Similarly, SPADE analysis can be used to extract a cellular hierarchy from the high-dimensional cytometry data which methods of the disclosure provide (Qiu et al. (2011; Nat. Biotechnol. 29:886-91)).

Samples

Certain aspects of the disclosure provides a method of imaging a biological sample. Such samples can comprise a plurality of cells which can be subjected to imaging mass cytometry (IMC) in order to provide an image of these cells in the sample. Embodiments of the present invention can be used to analyse tissue samples which are now studied by immunohistochemistry (IHC) techniques, but with the use of labelling atoms which are suitable for detection by mass spectrometry (MS) or optical emission spectrometry (OES). Furthermore, embodiments of the present invention provide various techniques for preparing tissue samples in order to provide improved resolution over IMC and IMS techniques using samples prepared in a traditional manner. In particular, embodiments of the present invention provide techniques for preparing samples which are suitable for imaging by electron microscopy, for preparing ultrathin samples, and a combination thereof. These methods are described further herein.

Any suitable tissue sample can be used in the methods described herein. For example, the tissue can include tissue from one or more of epithelium, muscle, nerve, skin, intestine, pancreas, kidney, brain, liver, blood (e.g. a blood smear), bone marrow, buccal swipes, cervical swipes, or any other tissue. The biological sample may be an immortalized cell line or primary cells obtained from a living subject. For diagnostic, prognostic or experimental (e.g., drug development) purposes the tissue can be from a tumor. In some embodiments, a sample may be from a known tissue, but it might be unknown whether the sample contains tumor cells. Imaging can reveal the presence of targets which indicate the presence of a tumor, thus facilitating diagnosis. Tissue from a tumor may comprise immune cells that are also characterized by the subject methods, and may provide insight into the tumor biology. The tissue sample may comprise formalin-fixed, paraffin-embedded (FFPE) tissue. The tissues can be obtained from any living multicellular organism, such as a mammal, an animal research model (e.g., of a particular disease, such as an immunodeficient rodent with a human tumor xenograft), or a human patient.

The tissue sample may be a section e.g. having a thickness within the range of 2-10 μm, such as between 4-6 μm. Techniques for preparing such sections are well known from the field of IHC e.g. using microtomes, including dehydration steps, fixation, embedding, permeabilization, sectioning etc. Thus, a tissue may be chemically fixed and then sections can be prepared in the desired plane. Cryosectioning or laser capture microdissection can also be used for preparing tissue samples. Samples may be permeabilised e.g. to permit uptake of reagents for labelling of intracellular targets (see above).

The size of a tissue sample to be analysed will be similar to current IHC methods, although the maximum size will be dictated by the laser ablation apparatus, and in particular by the size of sample which can fit into its sample chamber. A size of up to 5 mm×5 mm is typical, but smaller samples (e.g. 1 mm×1 mm) are also useful (these dimensions refer to the size of the section, not its thickness).

In addition to being useful for imaging tissue samples, the disclosure can instead be used for imaging of cellular samples such as monolayers of adherent cells or of cells which are immobilised on a solid surface (as in conventional immunocytochemistry). These embodiments are particularly useful for the analysis of adherent cells that cannot be easily solubilized for cell-suspension mass cytometry. Thus, as well as being useful for enhancing current immunohistochemical analysis, the disclosure can be used to enhance immunocytochemistry.

Ultrathin Samples

As discussed above, traditional IMC and IMS techniques use tissue samples that are several micrometres thick.

Therefore, embodiments of the present invention provide a method of preparing a biological sample for analysis comprising labelling the sample with labelling atoms (labelling atoms are described further herein) and sectioning the sample into thin sections, optionally wherein the sample is sectioned into sections of thickness of less than 10 micrometers or below, such as 1 micrometer or below, or 100 nm or below, or 50 nm or below, or 30 nm or below. Embodiments of the present invention also provides a method of preparing a biological sample for analysis comprising sectioning the sample into thin sections and labelling the sample with labelling atoms (labelling atoms are described further herein), optionally wherein the sample is sectioned into sections of thickness of less than 10 micrometers or below, such as 1 micrometer or below, or 100 nm or below, or 50 nm or below, or 30 nm or below. An automated microtome, such as the ATUMtome available from RM Boeckeler, can be used to section the sample into sections of a thickness in accordance with methods described herein. Ultrathin sections can contribute to smaller plumes of material being ablated from the sample, which can contribute to improved efficiency of ionization in the ionization conduit.

Samples prepared according to the method set out above can be used with any of the IMC and IMS techniques described herein. However, samples prepared according to the method set out above are particularly suited to analysis via laser ionisation.

Sample Carrier

In certain embodiments, the sample may be immobilized on a solid support (i.e. a sample carrier), to position it for imaging mass spectrometry. The solid support may be optically transparent, for example made of glass or plastic.

Sometimes, the sample carrier will comprise features that act as reference points for use with the apparatus and methods described herein, for instance to allow the calculation of the relative position of features/regions of interest that are to be ablated or desorbed and analysed. The reference points may be optically resolvable, or may be resolvable by mass analysis.

Target Elements

In imaging mass spectrometry, the distribution of one or more target elements (i.e., elements or elemental isotopes) may be of interest. In certain aspects, target elements are labelling atoms as described herein. A labelling atom may be directly added to the sample alone or covalently bound to or within a biologically active molecule. In certain embodiments, labelling atoms (e.g., metal tags) may be conjugated to a member of a specific binding pair (SBP), such as an antibody (that binds to its cognate antigen), aptamer or oligonucleotide for hybridizing to a DNA or RNA target, as described in more detail below. Labelling atoms may be attached to an SBP by any method known in the art. In certain aspects, the labelling atoms are a metal element, such as a lanthanide or transition element or another metal tag as described herein. The metal element may have a mass greater than 60 amu, greater than 80 amu, greater than 100 amu, or greater than 120 amu. Mass spectrometers described herein may deplete elemental ions below the masses of the metal elements, so that abundant lighter elements do not create space-charge effects and/or overwhelm the mass detector.

Labelling of the Tissue Sample

The disclosure produces images of samples which have been labelled with labelling atoms, for example a plurality of different labelling atoms, wherein the labelling atoms are detected by an apparatus capable of sampling specific, preferably subcellular, areas of a sample (the labelling atoms therefore represent an elemental tag). The reference to a plurality of different atoms means that more than one atomic species is used to label the sample. These atomic species can be distinguished using a mass detector (e.g. they have different m/Q ratios), such that the presence of two different labelling atoms within a plume gives rise to two different MS signals. The atomic species can also be distinguished using an optical spectrometer (e.g. different atoms have different emission spectra), such that the presence of two different labelling atoms within a plume gives rise to two different emission spectral signals.

Mass Tagged Reagents

Mass-tagged reagents as used herein comprise a number of components. The first is the SBP. The second is the mass tag. The mass tag and the SBP are joined by a linker, formed at least in part of by the conjugation of the mass tag and the SBP. The linkage between the SBP and the mass tag may also comprise a spacer. The mass tag and the SBP can be conjugated together by a range of reaction chemistries. Exemplary conjugation reaction chemistries include thiol maleimide, NHS ester and amine, or click chemistry reactivities (preferably Cu(I)-free chemistries), such as strained alkyne and azide, strained alkyne and nitrone and strained alkene and tetrazine.

Mass Tags

The mass tag used in embodiments of the present invention can take a number of forms. Typically, the tag comprises at least one labelling atom. A labelling atom is discussed herein below.

Accordingly, in its simplest form, the mass tag may comprise a metal-chelating moiety which is a metal-chelating group with a metal labelling atom co-ordinated in the ligand. In some instances, detecting only a single metal atom per mass tag may be sufficient. However, in other instances, it may be desirable of each mass tag to contain more than one labelling atom. This can be achieved in a number of ways, as discussed below.

A first means to generate a mass tag that can contain more than one labelling atom is the use of a polymer comprising metal-chelating ligands attached to more than one subunit of the polymer. The number of metal-chelating groups capable of binding at least one metal atom in the polymer can be between approximately 1 and 10,000, such as 5-100, 10-250, 250-5,000, 500-2,500, or 500-1,000. At least one metal atom can be bound to at least one of the metal-chelating groups. The polymer can have a degree of polymerization of between approximately 1 and 10,000, such as 5-100, 10-250, 250-5,000, 500-2,500, or 500-1,000. Accordingly, a polymer based mass tag can comprise between approximately 1 and 10,000, such as 5-100, 10-250, 250-5,000, 500-2,500, or 500-1,000 labelling atoms.

Labelling of Samples for Mass Cytometry Applications

In some embodiments, as described above, the apparatus and methods detect atoms that have been added to a sample (i.e. which are not normally present). Such atoms are called labelling atoms. In some embodiments, simultaneous detection of many more than one labelling atom, permitting multiplex label detection e.g. at least 3, 4, 5, 10, 20, 30, 32, 40, 50 or even 100 different labelling atoms is enabled. Labelling atoms can also be used in a combinatorial manner to even further increase the number of distinguishable labels. By labelling different targets with different labelling atoms it is possible to determine the presence of multiple targets on a single cell.

Labelling atoms that can be used in embodiments include any species that are detectable by MS or OES and that are substantially absent from the unlabelled tissue sample. Thus, for instance, $^{12}C$ atoms would be unsuitable as labelling atoms because they are naturally abundant, whereas $^{11}C$ could in theory be used for MS because it is an artificial isotope which does not occur naturally. Often the labelling atom is a metal. In preferred embodiments, however, the labelling atoms are transition metals, such as the rare earth metals (the 15 lanthanides, plus scandium and yttrium). These 17 elements (which can be distinguished by OES and MS) provide many different isotopes which can be easily distinguished (by MS). A wide variety of these elements are available in the form of enriched isotopes e.g. samarium has 6 stable isotopes, and neodymium has 7 stable isotopes, all of which are available in enriched form. The 15 lanthanide elements provide at least 37 isotopes that have non-redundantly unique masses. Examples of elements that are suitable for use as labelling atoms include Lanthanum (La), Cerium (Ce), Praseodymium (Pr), Neodymium (Nd), Promethium (Pm), Samarium (Sm), Europium (Eu), Gadolinium, (Gd), Terbium (Tb), Dysprosium (Dy), Holmium (Ho), Erbium (Er), Thulium (Tm), Ytterbium (Yb), Lutetium (Lu), Scandium (Sc), and Yttrium (Y). In addition to rare earth metals, other metal atoms are suitable for detection e.g. gold (Au), platinum (Pt), iridium (Ir), rhodium (Rh), bismuth (Bi), etc. The use of radioactive isotopes is not preferred as they are less convenient to handle and are unstable e.g. Pm is not a preferred labelling atom among the lanthanides.

In order to facilitate time-of-flight (TOF) analysis (as discussed herein) it is helpful to use labelling atoms with an atomic mass within the range 80-250 e.g. within the range 80-210, or within the range 100-200. This range includes all of the lanthanides, but excludes Sc and Y. The range of 100-200 permits a theoretical 101-plex analysis by using different labelling atoms, while taking advantage of the high spectral scan rate of TOF MS. As mentioned above, by choosing labelling atoms whose masses lie in a window above those seen in an unlabelled sample (e.g. within the range of 100-200), TOF detection can be used to provide rapid imaging at biologically significant levels.

Various numbers of labelling atoms can be attached to a single SBP member dependent upon the mass tag used (and so the number of labelling atoms per mass tag) and the number of mass tags that are attached to each SBP). Greater sensitivity can be achieved when more labelling atoms are attached to any SBP member. For example, greater than 10, 20, 30, 40, 50, 60, 70, 80, 90 or 100 labelling atoms can be attached to a SBP member, such as up to 10,000, for instance as 5-100, 10-250, 250-5,000, 500-2,500, or 500-1,000 labelling atoms. As noted above, monodisperse polymers containing multiple monomer units may be used, each containing a chelator such as diethylenetriaminepentaacetic acid (DTPA) or DOTA. DTPA, for example, binds 3+ lanthanide ions with a dissociation constant of around $10^{-6}$M. These polymers can terminate in a thiol which can be used for attaching to a SBP via reaction of that with a maleimide to attach a click chemistry reactivity in line with those discussed above. Other functional groups can also be used for conjugation of these polymers e.g. amine-reactive groups such as N-hydroxy succinimide esters, or groups reactive against carboxyls or against an antibody's glycosylation. Any number of polymers may bind to each SBP. Specific examples of polymers that may be used include straight-chain ("X8") polymers or third-generation dendritic ("DN3") polymers, both available as MaxPar™ reagents. Use of metal nanoparticles can also be used to increase the number of atoms in a label, as also discussed above.

In some embodiments, all labelling atoms in a mass tag are of the same atomic mass. Alternatively, a mass tag can comprise labelling atoms of differing atomic mass. Accordingly, in some instances, a labelled sample may be labelled with a series of mass-tagged SBPs each of which comprises just a single type of labelling atom (wherein each SBP binds its cognate target and so each kind of mass tag is localised on the sample to a specific e.g. antigen). Alternatively, in some instance, a labelled sample may be labelled with a series of mass-tagged SBPs each of which comprises a mixture of labelling atoms. In some instances, the mass-tagged SBPs used to label the sample may comprise a mix of those with single labelling atom mass tags and mixes of labelling atoms in their mass tags.

Spacer

As noted above, in some instances, the SBP is conjugated to a mass tag through a linker which comprises a spacer. There may be a spacer between the SBP and the click chemistry reagent (e.g. between the SBP and the strained cycloalkyne (or azide); strained cycloalkene (or tetrazine); etc.). There may be a spacer between the between the mass tag and the click chemistry reagent (e.g. between the mass tag and the azide (or strained cycloalkyne); tetrazine (or strained cycloalkene); etc.). In some instances there may be a spacer both between the SNP and the click chemistry reagent, and the click chemistry reagent and the mass tag.

The spacer might be a polyethylene glycol (PEG) spacer, a poly(N-vinylpyrolide) (PVP) spacer, a polyglycerol (PG) spacer, poly(N-(2-hydroxylpropyl)methacrylamide) spacer, or a polyoxazoline (POZ, such as polymethyloxazoline, polyethyloxazoline or polypropyloxazoline) or a C5-C20 non-cyclic alkyl spacer. For example, the spacer may be a PEG spacer with 3 or more, 4 or more, 5 or more, 6 or more, 7 or more, 8 or more, 9 or more, 10 or more, 11 or more, 12 or more, 15 or more of 20 or more EG (ethylene glycol) units. The PEG linker may have from 3 to 12 EG units, from 4 to 10, or may have 4, 5, 6, 7, 8, 9, or 10 EG units. The linker may include cystamine or derivatives thereof, may include one or more disulfide groups, or may be any other suitable linker known to one of skill in the art.

Spacers may be beneficial to minimize the steric effect of the mass tag on the SBP to which is conjugated. Hydrophilic spacers, such as PEG based spacers, may also act to improve the solubility of the mass-tagged SBP and act to prevent aggregation.

SBPs

Mass cytometry, including imaging mass cytometry is based on the principle of specific binding between members of specific binding pairs. The mass tag is linked to a specific binding pair member, and this localises the mass tag to the target/analyte which is the other member of the pair. Specific binding does not require binding to just one molecular species to the exclusion of others, however. Rather it defines that the binding is not-nonspecific, i.e. not a random interaction. An example of an SBP that binds to multiple targets would therefore be an antibody which recognises an epitope that is common between a number of different proteins. Here, binding would be specific, and mediated by the CDRs of the antibody, but multiple different proteins would be detected by the antibody. The common epitopes may be naturally occurring, or the common epitope could be an artificial tag, such as a FLAG tag. Similarly, for nucleic acids, the a nucleic acid of defined sequence may not bind exclusively to a fully complementary sequence, but varying tolerances of mismatch can be introduced under the use of hybridisation conditions of a differing stringencies, as would be appreciated by one of skill in the art. Nonetheless, this hybridisation is not non-specific, because it is mediated by homology between the SBP nucleic acid and the target analyte. Similarly, ligands can bind specifically to multiple receptors, a facile example being TNFα which binds to both TNFR1 and TNFR2.

The SBP may comprise any of the following: a nucleic acid duplex; an antibody/antigen complex; a receptor/ligand pair; or an aptamer/target pair. Thus a labelling atom can be attached to a nucleic acid probe which is then contacted with a tissue sample so that the probe can hybridise to complementary nucleic acid(s) therein e.g. to form a DNA/DNA duplex, a DNA/RNA duplex, or a RNA/RNA duplex. Similarly, a labelling atom can be attached to an antibody which is then contacted with a tissue sample so that it can bind to its antigen. A labelling atom can be attached to a ligand which is then contacted with a tissue sample so that it can bind to its receptor. A labelling atom can be attached to an aptamer ligand which is then contacted with a tissue sample so that it can bind to its target. Thus, labelled SBP members can be used to detect a variety of targets in a sample, including DNA sequences, RNA sequences, proteins, sugars, lipids, or metabolites.

The mass-tagged SBP therefore can be a protein or peptide, or a polynucleotide or oligonucleotide.

Examples of protein SBPs include an antibody or antigen binding fragment thereof, a monoclonal antibody, a polyclonal antibody, a bispecific antibody, a multispecific antibody, an antibody fusion protein, scFv, antibody mimetic, avidin, streptavidin, neutravidin, biotin, or a combination thereof, wherein optionally the antibody mimetic comprises a nanobody, affibody, affilin, affimer, affitin, alphabody, anticalin, avimer, DARPin, Fynomer, kunitz domain peptide, monobody, or any combination thereof, a receptor, such as a receptor-Fc fusion, a ligand, such as a ligand-Fc fusion, a lectin, for example an agglutinin such as wheat germ agglutinin.

The peptide may be a linear peptide, or a cyclical peptide, such as a bicyclic peptide. One example of a peptide that can be used is Phalloidin.

A polynucleotide or oligonucleotide generally refers to a single- or double-stranded polymer of nucleotides containing deoxyribonucleotides or ribonucleotides that are linked by 3'-5' phosphodiester bonds, as well as polynucleotide analogs. A nucleic acid molecule includes, but is not limited to, DNA, RNA, and cDNA. A polynucleotide analog may possess a backbone other than a standard phosphodiester linkage found in natural polynucleotides and, optionally, a modified sugar moiety or moieties other than ribose or deoxyribose. Polynucleotide analogs contain bases capable of hydrogen bonding by Watson-Crick base pairing to standard polynucleotide bases, where the analog backbone presents the bases in a manner to permit such hydrogen bonding in a sequence-specific fashion between the oligonucleotide analog molecule and bases in a standard polynucleotide. Examples of polynucleotide analogs include, but are not limited to xeno nucleic acid (XNA), bridged nucleic acid (BNA), glycol nucleic acid (GNA), peptide nucleic acids (PNAs), γPNAs, morpholino polynucleotides, locked nucleic acids (LNAs), threose nucleic acid (TNA), 2'-0-Methyl polynucleotides, 2'-0-alkyl ribosyl substituted polynucleotides, phosphorothioate polynucleotides, and boronophosphate polynucleotides. A polynucleotide analog may possess purine or pyrimidine analogs, including for example, 7-deaza purine analogs, 8-halopurine analogs, 5-halopyrimidine analogs, or universal base analogs that can pair with any base, including hypoxanthine, nitroazoles, isocarbostyril analogues, azole carboxamides, and aromatic triazole analogues, or base analogs with additional functionality, such as a biotin moiety for affinity binding.

Antibody SBP Members

In a typical embodiment, the labelled SBP member is an antibody. Labelling of the antibody can be achieved through conjugation of one or more labelling atom binding molecules to the antibody, by attachment of a mass tag using e.g. NHS-amine chemistry, sulfhydryl-maleimide chemistry, or the click chemistry (such as strained alkyne and azide, strained alkyne and nitrone, strained alkene and tetrazine etc.). Antibodies which recognise cellular proteins that are useful for imaging are already widely available for IHC usage, and by using labelling atoms instead of current labelling techniques (e.g. fluorescence) these known antibodies can be readily adapted for use in methods disclosure herein, but with the benefit of increasing multiplexing capability. Antibodies can recognise targets on the cell surface or targets within a cell. Antibodies can recognise a variety of targets e.g. they can specifically recognise individual proteins, or can recognise multiple related proteins which share common epitopes, or can recognise specific post-translational modifications on proteins (e.g. to distinguish between tyrosine and phosphor-tyrosine on a protein of interest, to distinguish between lysine and acetyl-lysine, to detect ubiquitination, etc.). After binding to its target, labelling atom(s) conjugated to an antibody can be detected to reveal the location of that target in a sample.

The labelled SBP member will usually interact directly with a target SBP member in the sample. In some embodiments, however, it is possible for the labelled SBP member to interact with a target SBP member indirectly e.g. a primary antibody may bind to the target SBP member, and a labelled secondary antibody can then bind to the primary antibody, in the manner of a sandwich assay. Usually, however, the method relies on direct interactions, as this can be achieved more easily and permits higher multiplexing. In both cases, however, a sample is contacted with a SBP member which can bind to a target SBP member in the sample, and at a later stage label attached to the target SBP member is detected.

Nucleic Acid SBPs, and Labelling Methodology Modifications

RNA is another biological molecule which the methods and apparatus disclosed herein are capable of detecting in a specific, sensitive and if desired quantitative manner. In the same manner as described above for the analysis of proteins, RNAs can be detected by the use of a SBP member labelled with an elemental tag that specifically binds to the RNA (e.g. an poly nucleotide or oligonucleotide of complementary sequence as discussed above, including a locked nucleic acid (LNA) molecule of complementary sequence, a peptide nucleic acid (PNA) molecule of complementary sequence, a plasmid DNA of complementary sequence, an amplified DNA of complementary sequence, a fragment of RNA of complementary sequence and a fragment of genomic DNA of complementary sequence). RNAs include not only the mature mRNA, but also the RNA processing intermediates and nascent pre-mRNA transcripts.

In certain embodiments, both RNA and protein are detected using methods described herein.

To detect RNA, cells in biological samples as discussed herein may be prepared for analysis of RNA and protein content using the methods and apparatus described herein. In certain aspects, cells are fixed and permeabilized prior to the hybridization step. Cells may be provided as fixed and/or permeabilized. Cells may be fixed by a crosslinking fixative, such as formaldehyde, glutaraldehyde. Alternatively or in addition, cells may be fixed using a precipitating fixative, such as ethanol, methanol or acetone. Cells may be permeabilized by a detergent, such as polyethylene glycol (e.g., Triton X-100), Polyoxyethylene (20) sorbitan monolaurate (Tween-20), Saponin (a group of amphipathic glycosides), or chemicals such as methanol or acetone. In certain cases, fixation and permeabilization may be performed with the same reagent or set of reagents. Fixation and permeabilization techniques are discussed by Jamur et al. in "Permeabilization of Cell Membranes" (Methods Mol. Biol., 2010).

Detection of target nucleic acids in the cell, or "in-situ hybridization" (ISH), has previously been performed using fluorophore-tagged oligonucleotide probes. As discussed herein, mass-tagged oligonucleotides, coupled with ionization and mass spectrometry, can be used to detect target nucleic acids in the cell. Methods of in-situ hybridization are known in the art (see Zenobi et al. "Single-Cell Metabolomics: Analytical and Biological Perspectives," Science vol. 342, no. 6163, 2013). Hybridization protocols are also described in U.S. Pat. No. 5,225,326 and US Pub. No. 2010/0092972 and 2013/0164750, which are incorporated herein by reference.

Prior to hybridization, cells present in suspension or immobilized on a solid support may be fixed and permeabilized as discussed earlier. Permeabilization may allow a cell to retain target nucleic acids while permitting target hybridization nucleotides, amplification oligonucleotides, and/or mass-tagged oligonucleotides to enter the cell. The cell may be washed after any hybridization step, for example, after hybridization of target hybridization oligonucleotides to nucleic acid targets, after hybridization of amplification oligonucleotides, and/or after hybridization of mass-tagged oligonucleotides.

Cells can be in suspension for all or most of the steps of the method, for ease of handling. However, the methods are also applicable to cells in solid tissue samples (e.g., tissue sections) and/or cells immobilized on a solid support (e.g., a slide or other surface). Thus, sometimes, cells can be in suspension in the sample and during the hybridization steps. Other times, the cells are immobilized on a solid support during hybridization.

Target nucleic acids include any nucleic acid of interest and of sufficient abundance in the cell to be detected by the subject methods. Target nucleic acids may be RNAs, of which a plurality of copies exist within the cell. For example, 10 or more, 20 or more, 50 or more, 100 or more, 200 or more, 500 or more, or 1000 or more copies of the target RNA may be present in the cell. A target RNA may be a messenger NA (mRNA), ribosomal RNA (rRNA), transfer RNA (tRNA), small nuclear RNA (snRNA), small interfering RNA (siRNA), long noncoding RNA (lncRNA), or any other type of RNA known in the art. The target RNA may be 20 nucleotides or longer, 30 nucleotides or longer, 40 nucleotides or longer, 50 nucleotides or longer, 100 nucleotides or longer, 200 nucleotides or longer, 500 nucleotides or longer, 1000 nucleotides or longer, between 20 and 1000 nucleotides, between 20 and 500 nucleotides in length, between 40 and 200 nucleotides in length, and so forth.

In certain embodiments, a mass-tagged oligonucleotide may be hybridized directly to the target nucleic acid sequence. However, hybridization of additional oligonucleotides may allow for improved specificity and/or signal amplification.

In certain embodiments, two or more target hybridization oligonucleotides may be hybridized to proximal regions on the target nucleic acid, and may together provide a site for hybridization of an additional oligonucleotides in the hybridization scheme.

In certain embodiments, the mass-tagged oligonucleotide may be hybridized directly to the two or more target hybridization oligonucleotides. In other embodiments, one or more amplification oligonucleotides may be added, simultaneously or in succession, so as to hybridize the two or more target hybridization oligonucleotides and provide multiple hybridization sites to which the mass-tagged oligonucleotide can bind. The one or more amplification oligonucleotides, with or without the mass-tagged oligonucleotide, may be provided as a multimer capable of hybridizing to the two or more target hybridization oligonucleotides.

While the use of two or more target hybridization oligonucleotides improves specificity, the use of amplification oligonucleotides increases signal. Two target hybridization oligonucleotides are hybridized to a target RNA in the cell. Together, the two target hybridization oligonucleotides provide a hybridization site to which an amplification oligonucleotide can bind. Hybridization and/or subsequent washing of the amplification oligonucleotide may be performed at a temperature that allows hybridization to two proximal target hybridization oligonucleotides, but is above the melting temperature of the hybridization of the amplification oligonucleotide to just one target hybridization oligonucleotide. The first amplification oligonucleotide provides multiple hybridization sites, to which second amplification oligonucleotides can be bound, forming a branched pattern. Mass-tagged oligonucleotides may bind to multiple hybridization sites provided by the second amplification nucleotides. Together, these amplification oligonucleotides (with or without mass-tagged oligonucleotides) are referred to herein as a "multimer". Thus the term "amplification oligonucleotide" includes oligonucleotides that provides multiple copies of the same binding site to which further oligonucleotides can anneal. By increasing the number of binding sites for other oligonucleotides, the final number of labels that can be found to a target is increased. Thus, multiple labelled oligonucleotides are hybridized, indirectly, to a single target RNA. This is enables the detection of low copy number RNAs, by increasing the number of detectable atoms of the element used per RNA.

One particular method for performing this amplification comprises using the RNAscope® method from Advanced cell diagnostics, as discussed in more detail below. A further alternative is the use of a method that adapts the QuantiGene® FlowRNA method (Affymetrix eBioscience). The assay is based on oligonucleotide pair probe design with branched DNA (bDNA) signal amplification. There are more than 4,000 probes in the catalog or custom sets can be requested at no additional charge. In line with the previous paragraph, the method works by hybridization of target hybridization oligonucleotides to the target, followed by the formation of a branched structure comprising first amplification oligonucleotides (termed preamplification oligonucleotides in the QuantiGene® method) to form a stem to which multiple second amplification oligonucleotides can anneal (termed simply amplification oligonucleotides in the QuantiGene® method). Multiple mass-tagged oligonucleotides can then bind.

Another means of amplification of the RNA signal relies on the rolling circle means of amplification (RCA). There are various means why which this amplification system can be introduced into the amplification process. In a first instance, a first nucleic acid is used as the hybridisation nucleic acid wherein the first nucleic acid is circular. The first nucleic acid can be single stranded or may be double-stranded. It comprises as sequence complementary to the target RNA. Following hybridisation of the first nucleic acid to the target RNA, a primer complementary to the first nucleic acid is hybridised to the first nucleic acid, and used for primer extension using a polymerase and nucleic acids, typically exogenously added to the sample. In some instances, however, when the first nucleic acid is added to sample, it may already have the primer for extension hybridised to it. As a result of the first nucleic acid being circular, once the primer extension has completed a full round of replication, the polymerase can displace the primer and extension continues (i.e. without 5'→3' exonuclease activity), producing linked further and further chained copies of the complement of the first nucleic acid, thereby amplifying that nucleic acid sequence. Oligonucleotides comprising an elemental tag (RNA or DNA, or LNA or PNA and the like) as discussed above) may therefore be hybridised to the chained copies of the complement of the first nucleic acid. The degree of amplification of the RNA signal can therefore be controlled by the length of time allotted for the step of amplification of the circular nucleic acid.

In another application of RCA, rather than the first, e.g., oligonucleotide that hybridises to the target RNA being circular, it may be linear, and comprise a first portion with a sequence complementary to its target and a second portion which is user-chosen. A circular RCA template with sequence homologous to this second portion may then be hybridised to this the first oligonucleotide, and RCA amplification carried out as above. The use of a first, e.g., oligonucleotide having a target specific portion and user-chosen portion is that the user-chosen portion can be selected so as to be common between a variety of different probes. This is reagent-efficient because the same subsequent amplification reagents can be used in a series of reactions detecting different targets. However, as understood by the skilled person, when employing this strategy, for individual detection of specific RNAs in a multiplexed reaction, each first nucleic acid hybridising to the target RNA will need to have a unique second sequence and in turn each circular nucleic acid should contain unique sequence that can be hybridised by the labelled oligonucleotide. In this manner, signal from each target RNA can be specifically amplified and detected.

Other configurations to bring about RCA analysis will be known to the skilled person. In some instances, to prevent the first, e.g., oligonucleotide dissociating from the target during the following amplification and hybridisation steps, the first, e.g., oligonucleotide may be fixed following hybridisation (such as by formaldehyde).

Further, hybridisation chain reaction (HCR) may be used to amplify the RNA signal (see, e.g., Choi et al., 2010, Nat. Biotech, 28:1208-1210). Choi explains that an HCR amplifier consists of two nucleic acid hairpin species that do not polymerise in the absence of an initiator. Each HCR hairpin consists of an input domain with an exposed single-stranded toehold and an output domain with a single-stranded toehold hidden in the folded hairpin. Hybridization of the initiator to the input domain of one of the two hairpins opens the hairpin to expose its output domain. Hybridization of this (previously hidden) output domain to the input domain of the second hairpin opens that hairpin to expose an output domain identical in sequence to the initiator. Regeneration of the initiator sequence provides the basis for a chain reaction of alternating first and second hairpin polymerization steps leading to formation of a nicked double-stranded 'polymer'. Either or both of the first and second hairpins can be labelled with an elemental tag in the application of the methods and apparatus disclosed herein. As the amplification procedure relies on output domains of specific sequence, various discrete amplification reactions using separate sets of hairpins can be performed independently in the same process. Thus this amplification also permits amplification in multiplex analyses of numerous RNA species. As Choi notes, HCR is an isothermal triggered self-assembly process. Hence, hairpins should penetrate the sample before undergoing triggered self-assembly in situ, suggesting the potential for deep sample penetration and high signal-to-background ratios Hybridization may include contacting cells with one or more oligonucleotides, such as target hybridization oligonucleotides, amplification oligonucleotides, and/or mass-tagged oligonucleotides, and providing conditions under which hybridization can occur. Hybridization may be performed in a buffered solution, such as saline sodium-citrate (SCC) buffer, phosphate-buffered saline (PBS), saline-sodium phosphate-EDTA (SSPE) buffer, TNT buffer (having Tris-HCl, sodium chloride and Tween 20), or any other suitable buffer. Hybridization may be performed at a temperature around or below the melting temperature of the hybridization of the one or more oligonucleotides.

Specificity may be improved by performing one or more washes following hybridization, so as to remove unbound oligonucleotide. Increased stringency of the wash may improve specificity, but decrease overall signal. The stringency of a wash may be increased by increasing or decreasing the concentration of the wash buffer, increasing temperature, and/or increasing the duration of the wash. RNAse inhibitor may be used in any or all hybridization incubations and subsequent washes.

A first set of hybridization probes, including one or more target hybridizing oligonucleotides, amplification oligonucleotides and/or mass-tagged oligonucleotides, may be used to label a first target nucleic acid. Additional sets of hybridization probes may be used to label additional target nucleic acids. Each set of hybridization probes may be specific for a different target nucleic acid. The additional sets of hybridization probes may be designed, hybridized and washed so as to reduce or prevent hybridization between oligonucleotides of different sets. In addition, the mass-tagged oligonucleotide of each set may provide a unique signal. As such, multiple sets of oligonucleotides may be used to detect 2, 3, 5, 10, 15, 20 or more distinct nucleic acid targets.

Sometimes, the different nucleic acids detected are splice variants of a single gene. The mass-tagged oligonucleotide can be designed to hybridize (directly or indirectly through other oligonucleotides as explained below) within the sequence of the exon, to detect all transcripts containing that exon, or may be designed to bridge the splice junctions to detect specific variants (for example, if a gene had three exons, and two splice variants—exons 1-2-3 and exons 1-3—then the two could be distinguished: variant 1-2-3 could be detected specifically by hybridizing to exon 2, and variant 1-3 could be detected specifically by hybridizing across the exon 1-3 junction.

Single Cell Analysis

Methods of the disclosure include laser ablation of multiple cells in a sample, and thus plumes from multiple cells are analysed and their contents are mapped to specific locations in the sample to provide an image. In most cases a user of the method will need to localise the signals to specific cells within the sample, rather than to the sample as a whole. To achieve this, the boundaries of cells (e.g. the plasma membrane, or in some cases the cell wall) in the sample can be demarcated.

Demarcation of cellular boundaries can be achieved in various ways. For instance, a sample can be studied using conventional techniques which can demarcate cellular boundaries, such as microscopy as discussed above. When performing these methods, therefore, an analysis system comprising a camera as discussed above is particularly useful. An image of this sample can then be prepared using a method of the disclosure, and this image can be superimposed on the earlier results, thereby permitting the detected signals to be localised to specific cells. Indeed, as discussed above, in some cases the laser ablation may be directed only to a subset of cells in the sample as determined to be of interest by the use of microscopy based techniques.

To avoid the need to use multiple techniques, however, it is possible to demarcate cellular boundaries as part of the imaging method of the disclosure. Such boundary demarcation strategies are familiar from IHC and immunocytochemistry, and these approaches can be adapted by using labels which can be detected. For instance, the method can involve labelling of target molecule(s) which are known to be located at cellular boundaries, and signal from these labels can then be used for boundary demarcation. Suitable target molecules include abundant or universal markers of cell boundaries, such as members of adhesion complexes (e.g. β-catenin or E-cadherin). Some embodiments can label more than one membrane protein in order to enhance demarcation.

In addition to demarcating cell boundaries by including suitable labels, it is also possible to demarcate specific organelles in this way. For instance, antigens such as histones (e.g. H3) can be used to identify the nucleus, and it is also possible to label mitochondrial-specific antigens, cytoskeleton-specific antigens, Golgi-specific antigens, ribosome-specific antigens, etc., thereby permitting cellular ultrastructure to be analysed by methods of the disclosure.

Signals which demarcate the boundary of a cell (or an organelle) can be assessed by eye, or can be analysed by computer using image processing. Such techniques are known in the art for other imaging techniques e.g. Arce et al. (2013; *Scientific Reports* 3, article 2266) describes a segmentation scheme that uses spatial filtering to determine cell boundaries from fluorescence images, Ali et al. (2011; *Mach Vis Appl* 23:607-21) discloses an algorithm which determines boundaries from brightfield microscopy images, Pound et al. (2012; *The Plant Cell* 24:1353-61) discloses the CellSeT method to extract cell geometry from confocal microscope images, and Hodneland et al. (2013; *Source Code for Biology and Medicine* 8:16) discloses the CellSegm MATLAB toolbox for fluorescence microscope images. A method which is useful with the disclosure uses watershed transformation and Gaussian blurring. These image processing techniques can be used on their own, or they can be used and then checked by eye.

Once cellular boundaries have been demarcated it is possible to allocate signal from specific target molecules to individual cells. It can also be possible to quantify the amount of a target analyte(s) in an individual cell e.g. by calibrating the methods against quantitative standards.

Reference Particles

As described herein, reference particles of known elemental or isotopic composition may be added to the sample (or the sample carrier) for use as a reference during detection of target elemental ions in the sample. In certain embodiments, reference particles comprise metal elements or isotopes, such as transition metals or lanthanides. For example, reference particles may comprise elements or isotopes of mass greater than 60 amu, greater than 80 amu, greater than 100 amu, or greater than 120 amu.

Target elements, such as labelling atoms, can be normalized within a sample run based on elemental ions detected from individual reference particles. For example, the subject methods may include switching between detecting elemental ions from individual reference particles and detecting only target elemental ions.

The term "comprising" encompasses "including" as well as "consisting" e.g. a composition "comprising" X may consist exclusively of X or may include something additional e.g. X+Y.

The term "about" in relation to a numerical value x is optional and means e.g. x±10%.

The word "substantially" does not exclude "completely" e.g. a composition which is "substantially free" from Y may be completely free from Y. Where necessary, the word "substantially" may be omitted from the definition of embodiments of the present invention.

Figure 1:
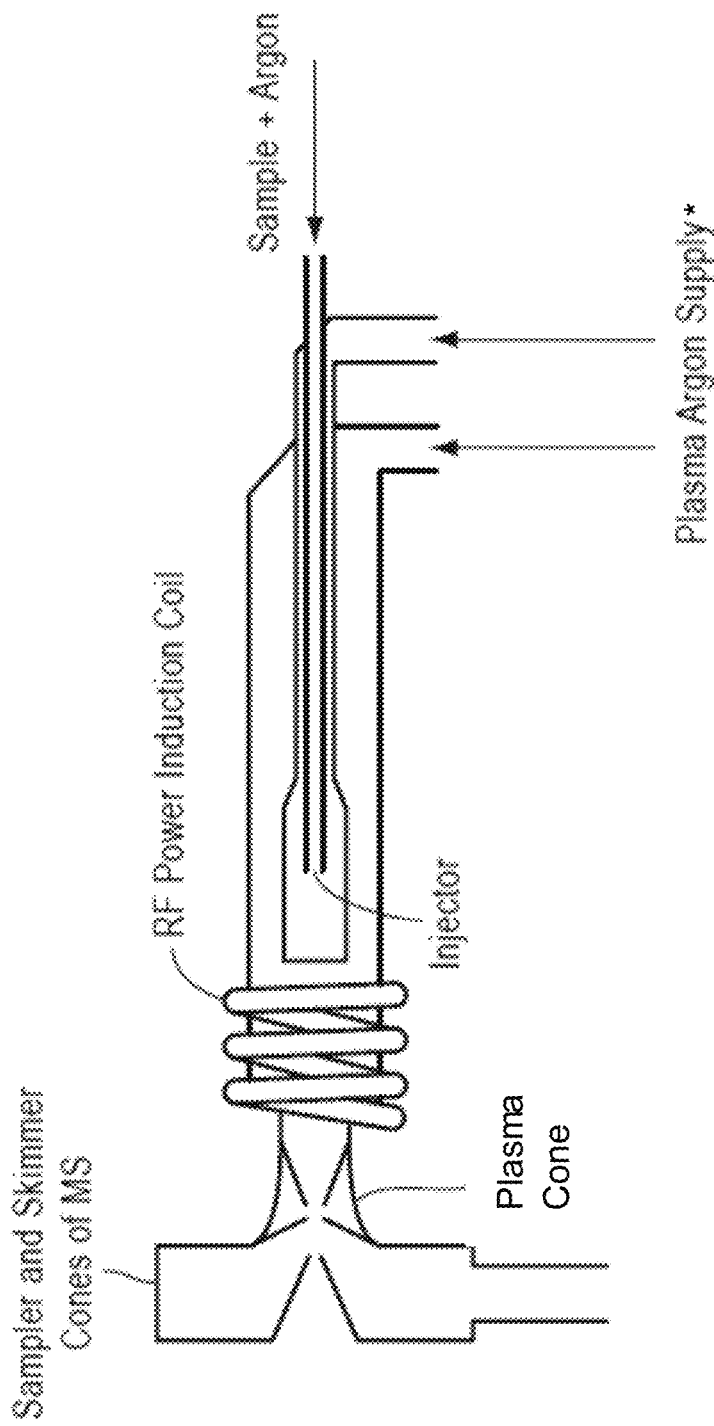
FIG. 1. Diagram of an ICP torch.
Figure 2:
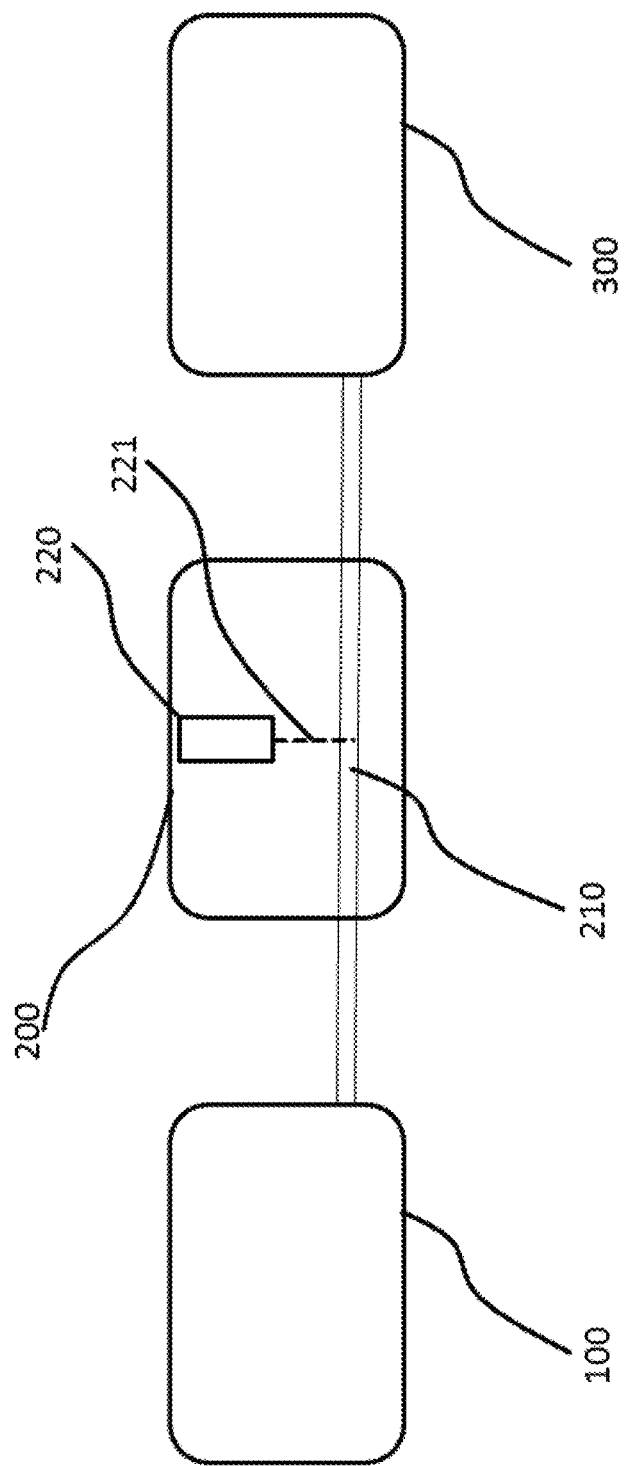
FIG. 2. Diagram of a mass cytometer of embodiments of the present invention.
Figure 3:
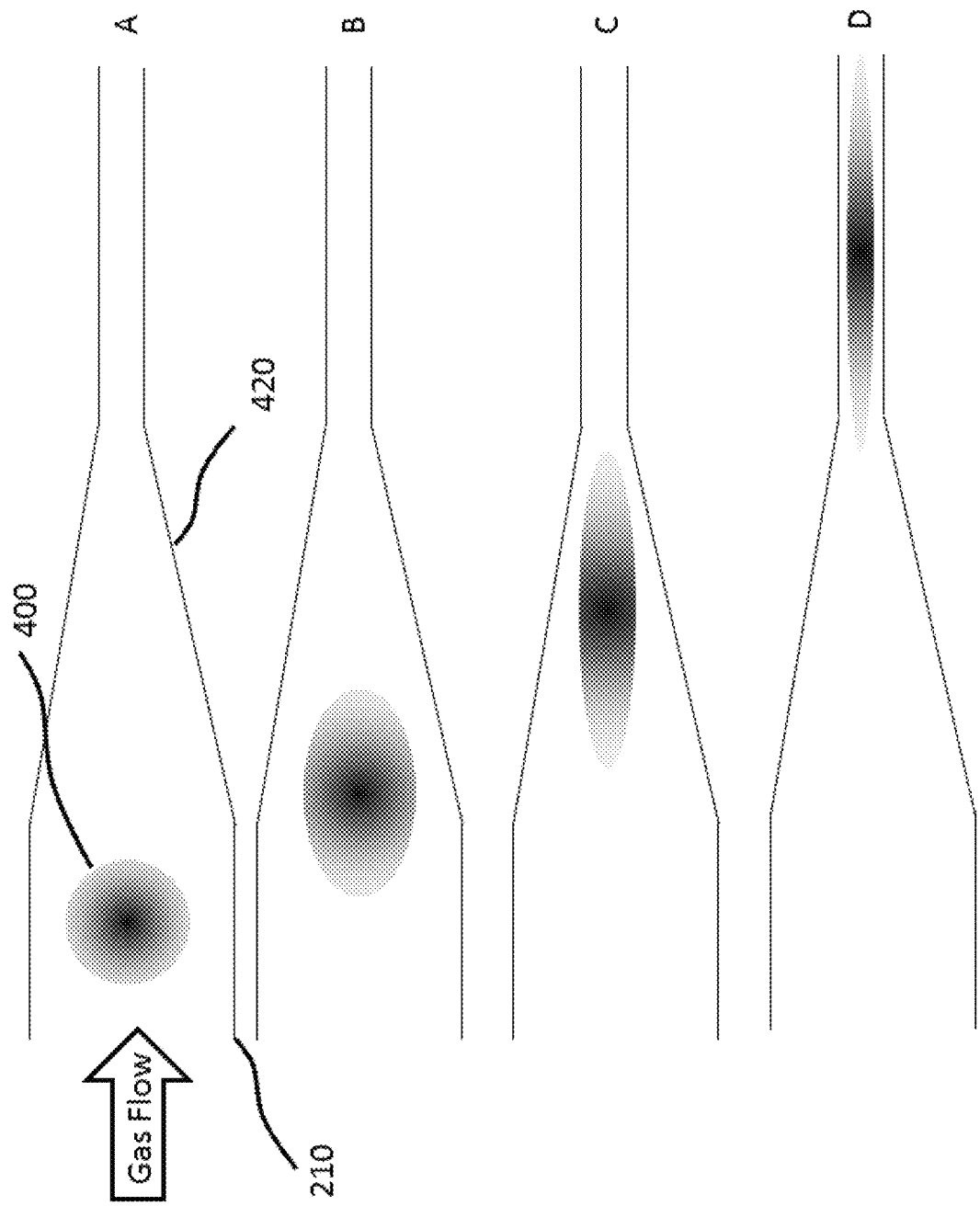
FIG. 3. Diagram of plume reshaping by passage through a tapered conduit. Here the initial spherical cloud of material is reduced in diameter as it passes through the narrowing conduit. Flow is typically fastest in the centre of the conduit, meaning that as the cloud is carried along the conduit by the flowing gas, it elongates. Appropriate design of the tapered conduit and gas flow can produce a long steam of material with a very small diameter from a previously spherical cloud.
Figure 4:
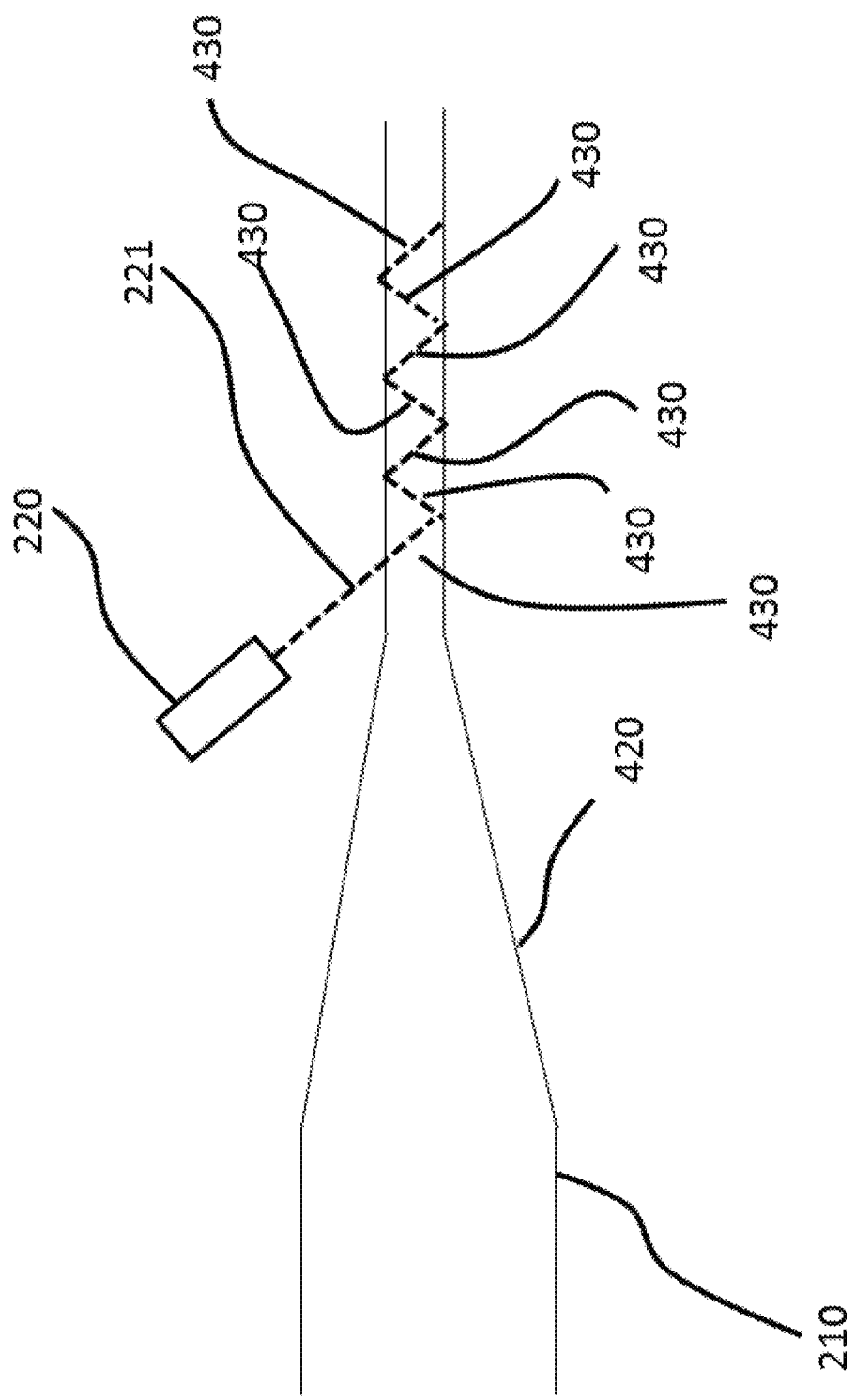
FIG. 4. Diagram of a reflector arrangement.
Figure 5:
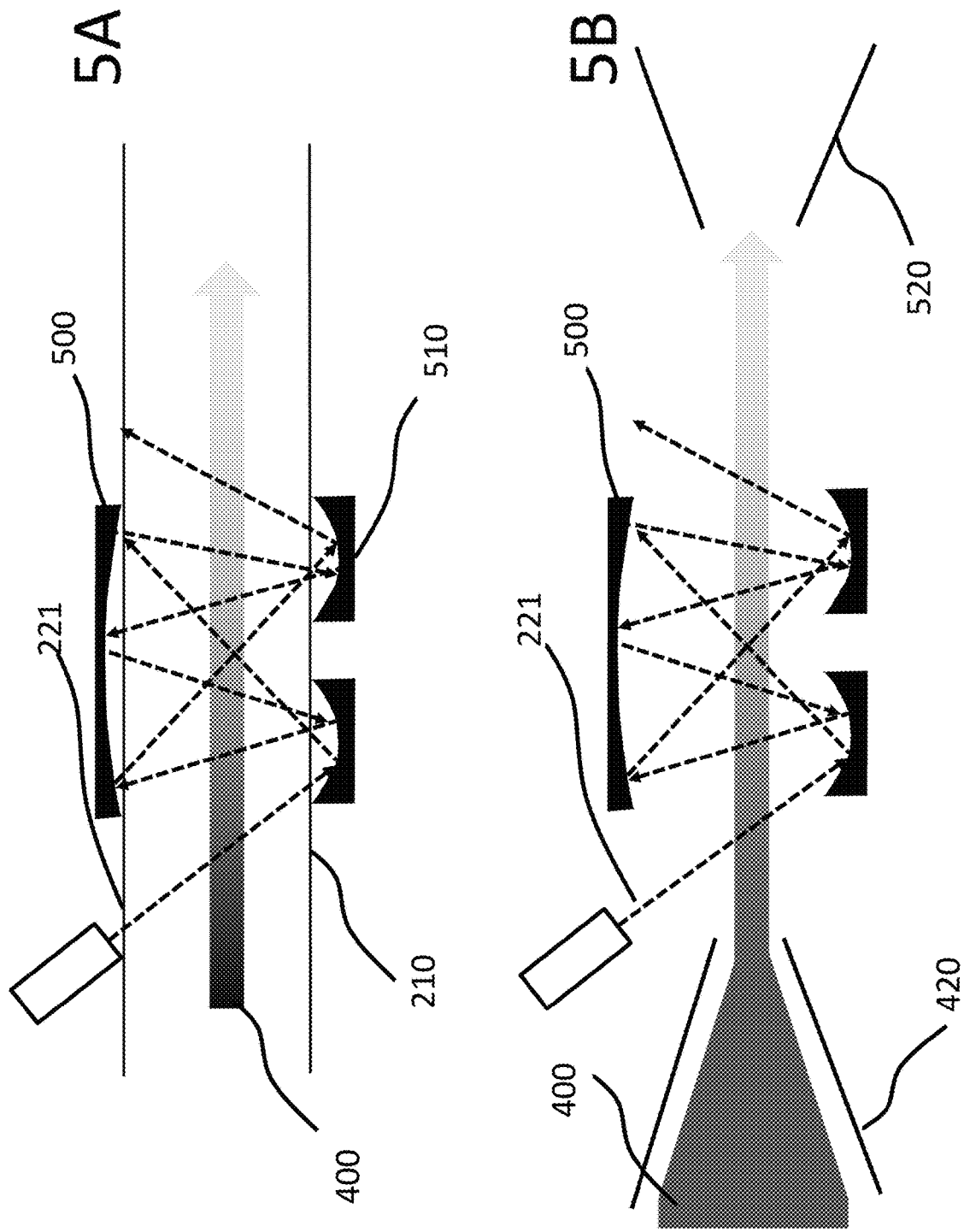
FIG. 5. Diagrams of a reflector arrangement using convex reflectors. 5A shows reflection through the conduit, and 5B shows reflection at the tapered end of the conduit.
Figure 6:
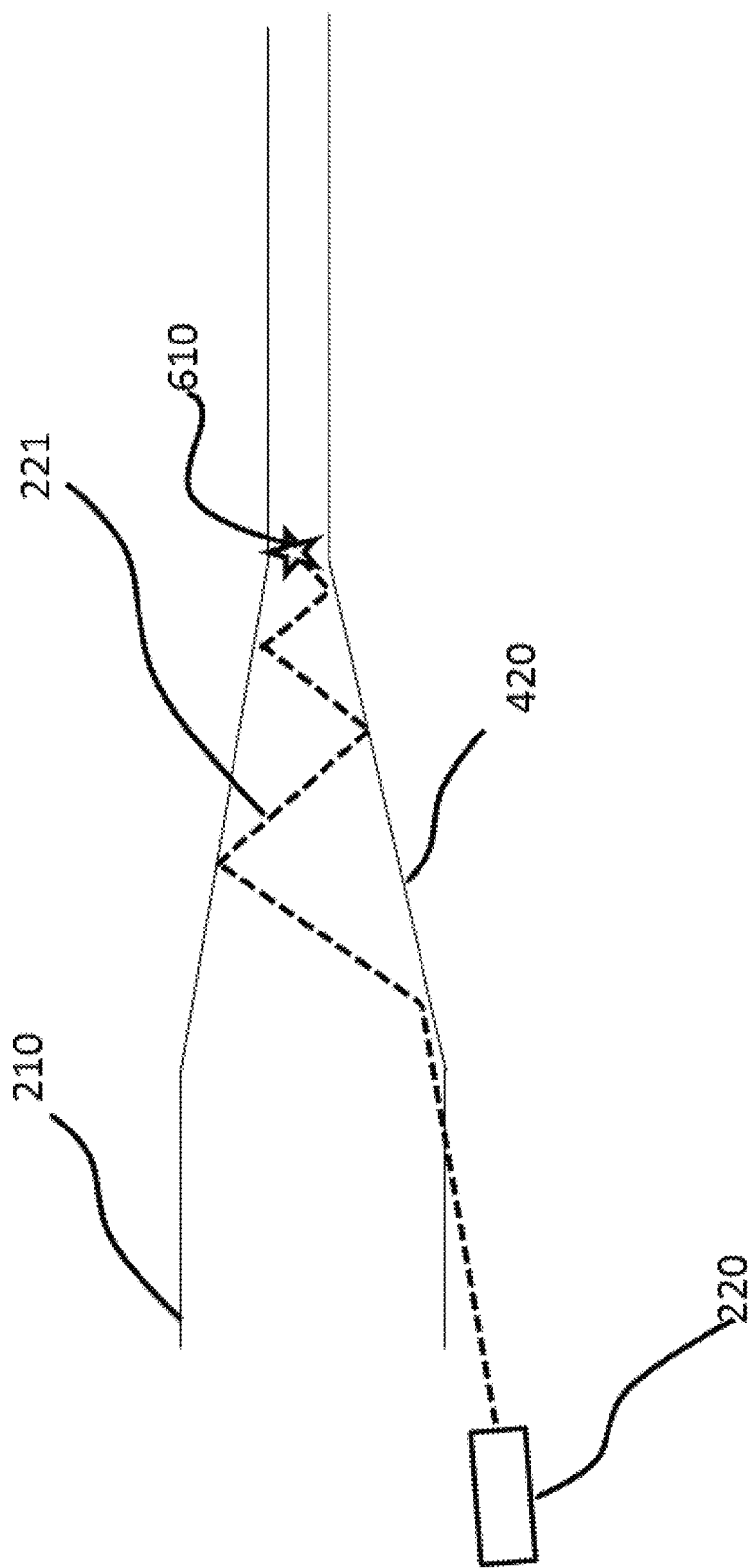
FIG. 6. Diagram of laser ionisation in which laser light is directed at the wide portion of the conduit, which acts a waveguide, such that energy density only reaches levels suitable for ionisation in the in the tapered portion.
Figure 7:
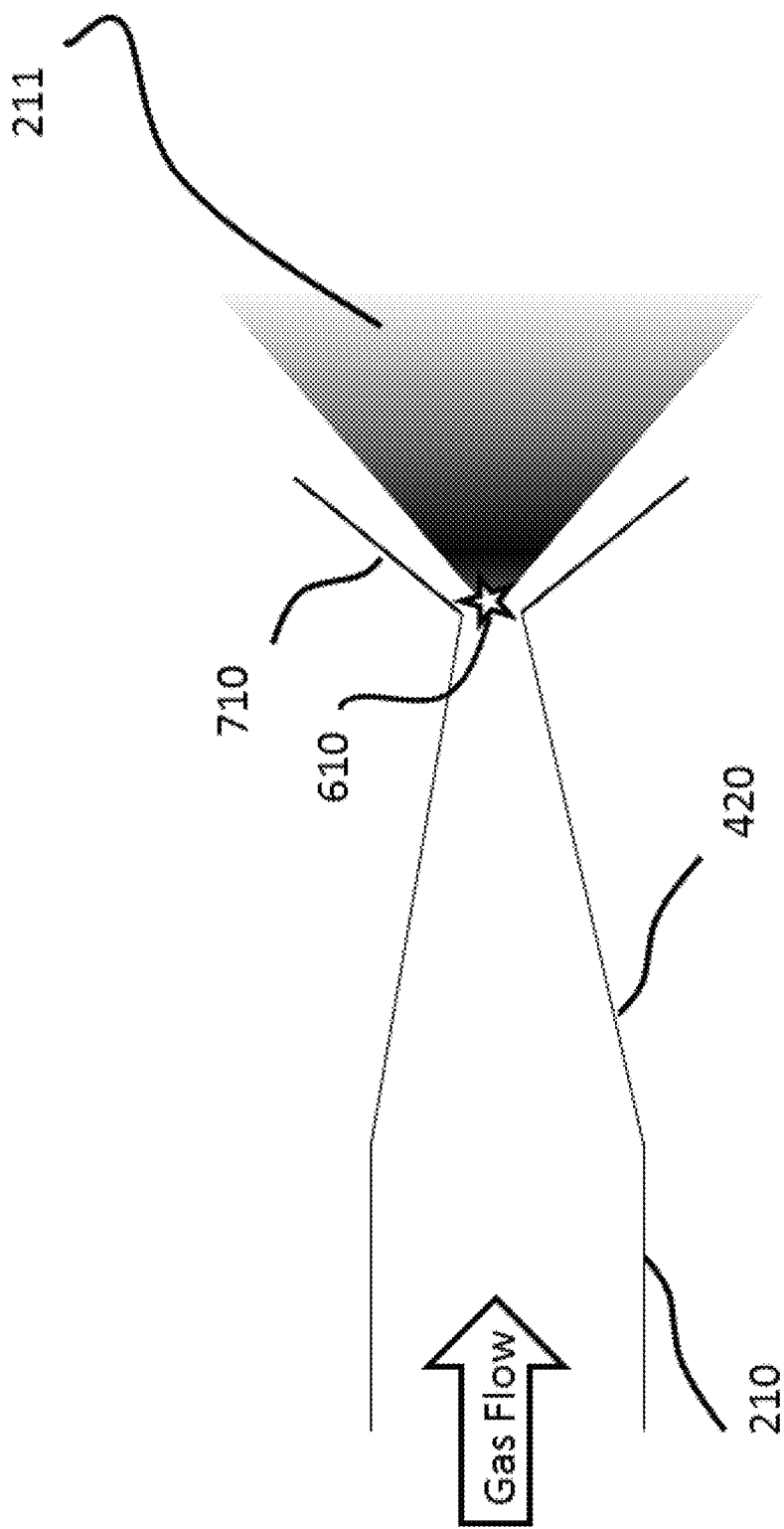
FIG. 7. Diagram of laser ionisation using an embodiment of the ionisation conduit comprising a flare-out.

The invention claimed is:

1. An apparatus comprising:
   a. a sampler;
   b. a laser ionisation system to receive a plume of material removed from a sample by the sampler, wherein the laser ionisation system comprises an ionisation system conduit comprising a tapered portion along which the internal diameter of the conduit is decreased, the tapered portion configured to lengthen the plume of material, the laser ionization system further comprising a pulsed laser adapted to ionise and generate elemental ions from the lengthened plume of material passing through or at the exit of the ionisation system conduit; and
   c. a mass spectrometer to receive elemental ions from said ionisation system and to analyse said elemental ions.

2. The apparatus of claim 1, wherein the laser of the laser ionisation system is a picosecond laser or a femtosecond laser.

3. The apparatus of claim 2, wherein the laser of the laser ionisation system is a solid state laser, fiber laser, semiconductor laser or a VECSEL.

4. The apparatus of claim 2, wherein the laser of the laser ionisation system is adapted to produce a pulse with a duration of less than 1 ps.

5. The apparatus of claim 4, wherein the laser of the laser ionisation system is adapted to produce the pulse with a duration of 500 fs or less.

6. The apparatus of claim 5, wherein the laser of the laser ionisation system is adapted to produce the pulse at a repetition rate of at least 100,000 Hz.

7. The apparatus of claim 1, wherein the laser of the laser ionisation system is adapted to have beam width of 100 μm or less.

8. The apparatus of claim 1, wherein the decrease in diameter of the ionisation system conduit is around 2-fold or greater.

9. The apparatus of claim 1, wherein the tapered portion is adapted such that gas flow at the narrow end of the tapered portion is supersonic.

10. The apparatus of claim 1, wherein the ionisation system conduit comprises a flare-out downstream of the tapered portion, and the ionisation laser is positioned to direct laser light from the flare-out side of the taper.

11. The apparatus of claim 1, wherein the laser ionisation system further comprises a reflector arrangement to cause laser radiation generated by the laser to pass through the ionisation system conduit or the path of material exiting the ionisation system conduit a plurality of times.

12. The apparatus of claim 11, wherein the reflector arrangement comprises one or more reflectors which are shaped to provide multiple focal points within or at the exit of the ionisation system conduit.

13. The apparatus of claim 1 wherein the sampler is a laser ablation system.

14. The apparatus of claim 13, wherein the laser of the laser ablation system is adapted to ablate the sample at a repetition rate of around 10 Hz or more.

15. The apparatus of claim 13, wherein the sampler is configured to generate a plume of sample material, and the laser ionisation system is configured to generate multiple laser pulses for ionising a single plume.

16. The apparatus of claim 15, wherein the laser of the laser ionisation system is configured to produce a pulse at a repetition rate 103 times greater than the repetition rate of the laser ablation system.

17. The apparatus of claim 13, wherein the laser of the laser ablation system is configured to ablate the sample with a spot size diameter of less than 4 μm.

18. The apparatus of claim 13, wherein the laser of the laser ablation system is configured to ablate the sample to ablate to sample to a depth of 500 nm or less per laser pulse.

19. The apparatus of claim 1 which is a mass cytometer.

20. A method of performing mass cytometry, using the apparatus of claim 1.

21. The apparatus of claim 1 wherein the tapered portion decreases to an internal diameter that is smaller than a diameter of the plume of material as received at the laser ionization system.

22. A method of performing mass cytometry comprising obtaining sample material from a sampler, reshaping a plume of the obtained sample material utilizing a conduit comprising a tapered portion configured to lengthen the plume, ionising the lengthened plume of sample material obtained from the sampler with a laser to create sample elemental ions, and detecting said sample elemental ions by mass spectrometry.

23. A method of analysing a sample, comprising obtaining multiple portions of sample material from a sampler, reshaping plumes of the multiple portions of sample material utilizing a conduit comprising a tapered portion configured to lengthen the plumes, separately ionising the lengthened plumes of sample material obtained from the sampler with a laser to create sample elemental ions, and detecting said sample elemental ions by mass spectrometry, wherein each portion of material is ionised by multiple laser pulses.

24. The method of claim 22 wherein the tapered portion tapers to a diameter that is smaller than a diameter of the plume as received at the tapered portion.

25. The method of claim 23 wherein the tapered portion tapers to a diameter that is smaller than diameters of the plumes as received at the tapered portion.

* * * * *